(12) United States Patent
Han et al.

(10) Patent No.: US 10,788,422 B2
(45) Date of Patent: Sep. 29, 2020

(54) MOBILE TERMINAL COMPRISING A DUST SENSOR FOR SENSING SCATTERED LIGHT BY DUST PARTICLES AND OPERATION METHOD OF THE SAME

(71) Applicant: LG ELECTRONICS INC., Seoul (KR)

(72) Inventors: Dongsu Han, Seoul (KR); Soseul Jin, Seoul (KR); Jungwhan Kim, Seoul (KR); Yoonwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 16/126,909

(22) Filed: Sep. 10, 2018

(65) Prior Publication Data

US 2019/0094140 A1 Mar. 28, 2019

Related U.S. Application Data

(60) Provisional application No. 62/561,691, filed on Sep. 22, 2017.

(30) Foreign Application Priority Data

Mar. 12, 2018 (KR) .................. 10-2018-0028703

(51) Int. Cl.
*G01N 21/94* (2006.01)
*G01N 21/47* (2006.01)
(Continued)

(52) U.S. Cl.
CPC ......... *G01N 21/47* (2013.01); *G01N 15/0205* (2013.01); *G01N 15/0211* (2013.01);
(Continued)

(58) Field of Classification Search
CPC .............. G01N 15/0205; G01N 15/06; G01N 2015/1075; G01N 21/47; G01N 21/94;
(Continued)

(56) References Cited

U.S. PATENT DOCUMENTS 9,726,579 B2* 8/2017 Han .................. G01N 1/2205
2004/0188598 A1 9/2004 Kawai
(Continued)

FOREIGN PATENT DOCUMENTS

KR 20120021608 3/2012

OTHER PUBLICATIONS

European Patent Office Application Serial No. 18193363.1, Search Report dated Nov. 6, 2018, 12 pages.

*Primary Examiner* — Que Tan Le
(74) *Attorney, Agent, or Firm* — Lee, Hong, Degerman, Kang & Waimey PC

(57) ABSTRACT

A mobile terminal and an operation method thereof are disclosed. A mobile terminal according to an embodiment of the present disclosure may include a display; a front window disposed at a front of the mobile terminal; an inner frame formed with a hole configured to allow light to pass through from the front window; and a dust sensor comprising a light emitting portion and a light receiving portion, wherein the light emitting portion is disposed adjacent to the inner frame and configured to emit light through the hole, and wherein the light receiving portion is configured to generate a signal based on light sensed through the hole that is emitted by the light emitting portion and scattered by dust particles.

18 Claims, 28 Drawing Sheets

(51) Int. Cl.
  *G01N 15/02* (2006.01)
  *G01N 15/06* (2006.01)
  *G01N 15/00* (2006.01)
  *G01N 15/10* (2006.01)

(52) U.S. Cl.
  CPC ..... *G01N 15/06* (2013.01); *G01N 2015/0046* (2013.01); *G01N 2015/0693* (2013.01); *G01N 2015/1075* (2013.01)

(58) Field of Classification Search
  CPC .... G01J 3/4412; H04B 1/3833; H04M 1/026; H04M 1/72522; H04M 2250/12
  USPC .................................. 250/222.2, 221, 239
  See application file for complete search history.

(56) References Cited

U.S. PATENT DOCUMENTS

2016/0146715 A1    5/2016    Shim et al.
2017/0119262 A1    5/2017    Shim et al.

\* cited by examiner

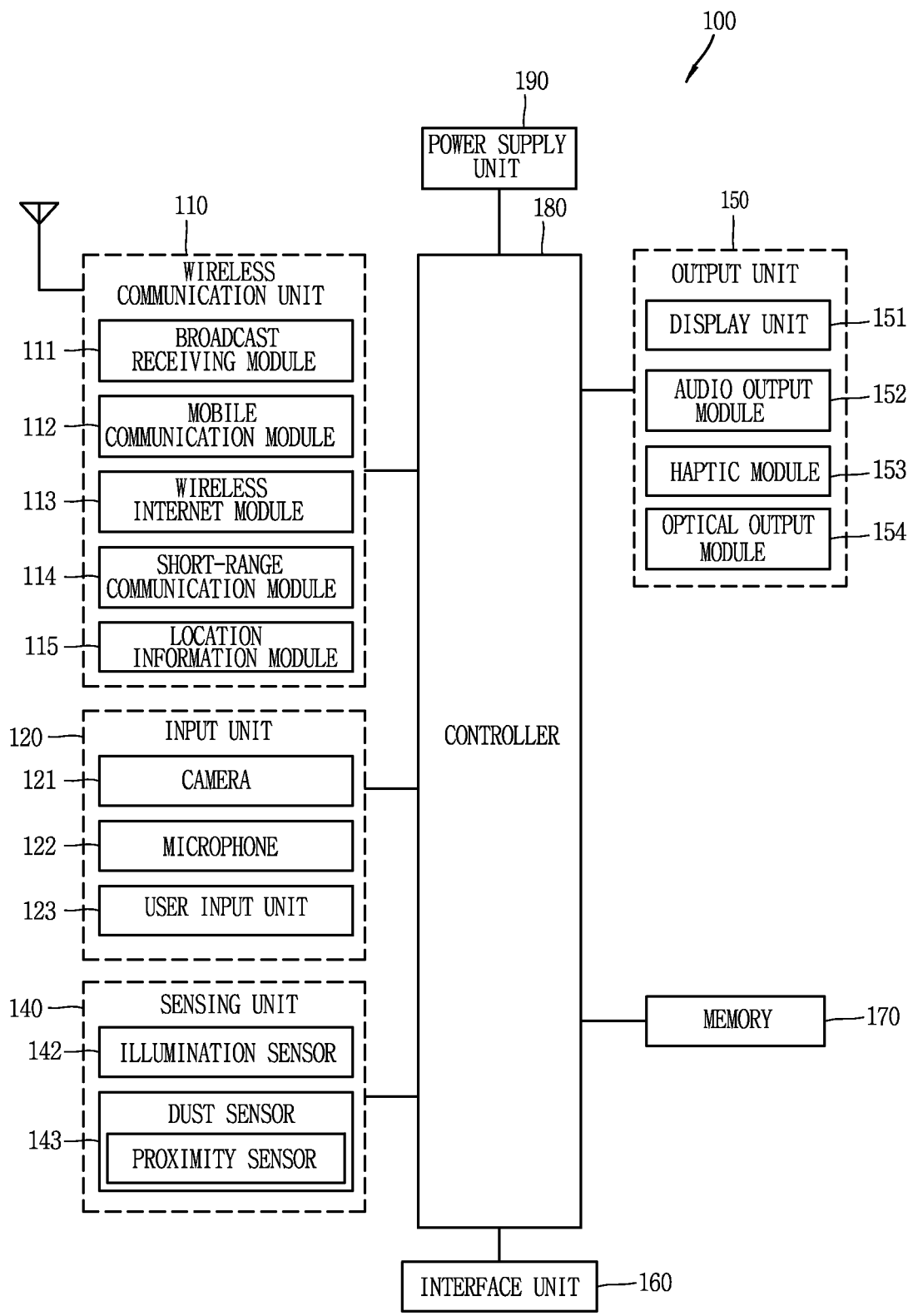

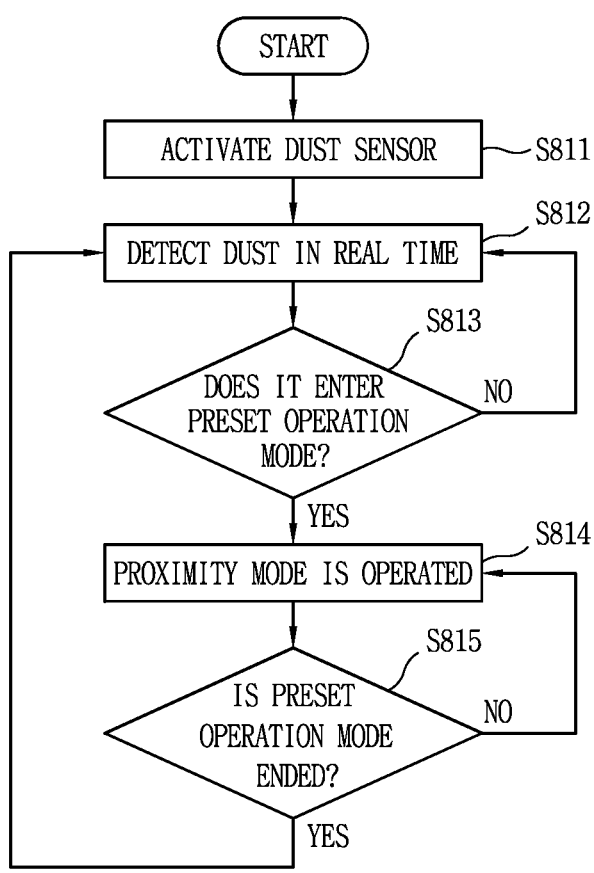

MOBILE TERMINAL COMPRISING A DUST SENSOR FOR SENSING SCATTERED LIGHT BY DUST PARTICLES AND OPERATION METHOD OF THE SAME

CROSS-REFERENCE TO RELATED APPLICATIONS

Pursuant to 35 U.S.C. § 119, this application claims the benefit of earlier filing date and right of priority to U.S. Provisional Application No. 62/561,691, filed Sep. 22, 2017, and also claims the benefit of Korean Application No. 10-2018-0028703, filed on Mar. 12, 2018, the contents of which are all incorporated by reference herein in their entirety.

BACKGROUND OF THE INVENTION

1. Field of the Invention

The present disclosure relates to a mobile terminal having a dust sensor and a control method thereof.

2. Background of the Invention

Terminals may be classified into mobile/portable terminals and stationary terminals according to their mobility. Furthermore, mobile terminals may be divided into handheld terminals and vehicle mounted terminals.

The terminal has various functions according to the development of technologies. The terminal may be implemented in the form of a multimedia player with various functions such capturing pictures or videos, playing music or video files, playing games, receiving broadcast, and the like, and the improvement of structural or software elements of the terminal may be taken into consideration in order to support and enhance the functions of the terminal.

In recent years, as functions of a mobile terminal have diversified, various technologies related to providing information to a user using information on the state of the surrounding environment have been developed and studied. In particular, due to growing interest in air pollution such as fine dust, there is a need for users to check the current status of air quality and use it in various ways. However, when a sensor for satisfying the need is additionally mounted inside the terminal, it may interfere with recent bezel-less design trends of terminals and the implementation of products with low thickness.

SUMMARY OF THE INVENTION

Accordingly, an object of the present disclosure is to provide a mobile terminal capable of mounting a miniaturized sensor having a structure suitable for a bezel-less design trend of a terminal without requiring an additional internal accommodation space to detect dust concentration in the air, and an operation method thereof.

Furthermore, another object of the present disclosure is to provide a mobile terminal capable of controlling a dust detection interval according to the detected dust concentration and an operation mode of the terminal without adding hardware, and an operation method thereof.

In addition, still another object of the present disclosure is to provide a mobile terminal capable of performing a function of a different sensor without collision using a single miniaturized sensor mounted thereon, and sharing a sensed concentration of dust to use it in various ways, and an operation method thereof.

For this purpose, a mobile terminal according to an embodiment of the present disclosure may include a display; a front window disposed at a front of the mobile terminal; an inner frame formed with a hole configured to allow light to pass through from the front window; and a dust sensor comprising a light emitting portion and a light receiving portion, wherein the light emitting portion is disposed adjacent to the inner frame and configured to emit light through the hole, and wherein the light receiving portion is configured to generate a signal based on light sensed through the hole that is emitted by the light emitting portion and scattered by dust particles.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 1A is a block diagram for explaining a mobile terminal associated with the present disclosure;

FIGS. 8A, 8B and 9 are different flowcharts for explaining an operation method for replacing a dust sensor of a mobile terminal associated with the present disclosure with a proximity sensor.

DETAILED DESCRIPTION OF THE PREFERRED EMBODIMENTS

Figure 1B:
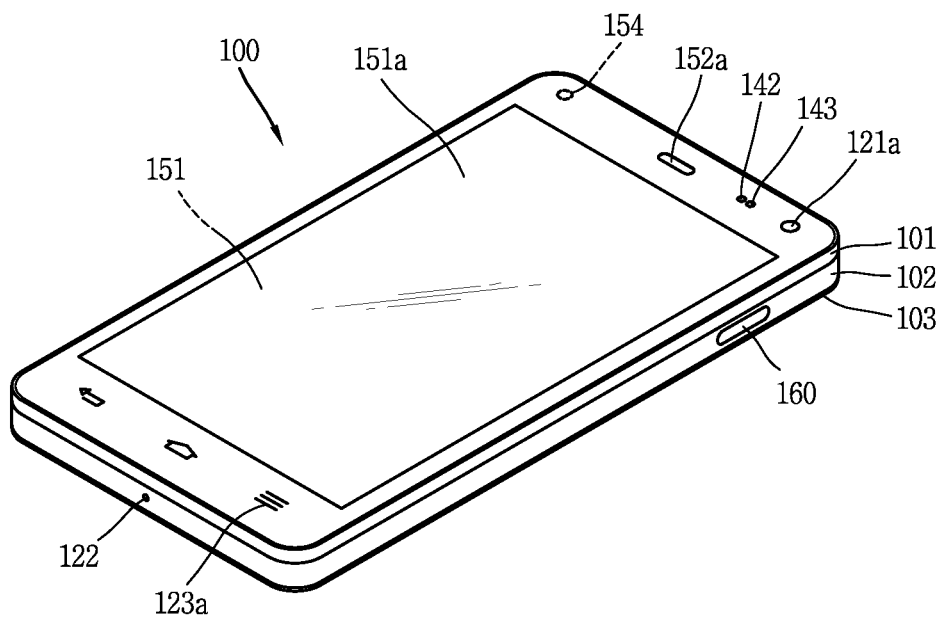
FIGS. 1B and 1C are conceptual views illustrating an example in which a mobile terminal associated with the present disclosure is seen from different directions.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. Also, it should be noted that the accompanying drawings are merely illustrated to easily explain the concept of the invention, and therefore, they should not be construed to limit the technological concept disclosed herein by the accompanying drawings.

Furthermore, it will be understood that when an element such as a layer, region or substrate is referred to as being "on" another element, it can be directly on the another element or an intermediate element may also be interposed therebetween.

FIG. 1A is a block diagram for explaining a terminal 100 associated with the present disclosure.

The terminal 100 may include a wireless communication unit 110, an input unit 120, a sensing unit 140, an output unit 150, an interface unit 160, a memory 170, a controller 180, and a power supply unit 190. The components illustrated in FIG. 1 are not essential for implementing the terminal 100, and thus the terminal described herein may have more or fewer components than those listed above.

In more detail, the wireless communication unit 110 of those components may typically include one or more modules allowing wireless communications between the terminal 100 and a wireless communication system, between the terminal 100 and another mobile terminal, or between the terminal 100 and an external server. In addition, the wireless communication unit 110 may include one or more modules for connecting the terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 is typically implemented using one or more sensors configured to sense internal information of the terminal 100, the surrounding environment of the terminal 100, user information, and the like. For example, the sensing unit 140 may include a proximity sensor, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

In addition, in the present disclosure, the sensing unit 140 further includes a dust sensor 143 for detecting dust around the terminal. Moreover, the dust sensor 143 may perform the role of a conventional proximity sensor when necessary. In this case, it may be possible to remove a hardware proximity sensor.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the terminal 100 and a user, as well as functioning as the user input unit 123 which provides an input interface between the terminal 100 and the user.

The interface unit 160 serves as an interface with various types of external devices that can be coupled to the terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The terminal 100 may execute an appropriate control associated with a connected external device, in response to the external device being connected to the interface unit 160.

In addition, the memory 170 stores data that support various functions of the terminal 100. The memory 170 is typically implemented to store data to support various functions or features of the terminal 100. For instance, the memory 170 may be configured to store application programs executed in the terminal 100, data or instructions for operations of the terminal 100, and the like. At least some of those application programs may be downloaded from an external server via wireless communication. Some others of those application programs may be installed within the terminal 100 at the time of being shipped for basic functions of the terminal 100 (for example, receiving a call, placing a call, receiving a message, sending a message, etc.). On the other hand, the application programs may be stored in the memory 170, installed in the terminal 100, and executed by the controller 180 to perform an operation (or a function) of the terminal 100.

The controller 180 may typically control an overall operation of the terminal 100 in addition to the operations associated with the application programs. The controller 180 may provide or process information or functions appropriate for a user by processing signals, data, information and the like, which are input or output by the various components depicted in FIG. 1A, or activating application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the terminal 100 for operation.

The power supply unit 190 may receive external power or internal power and supply appropriate power required for operating respective elements and components included in the terminal 100 under the control of the controller 180. The power supply unit 190 may include a battery, and the battery may be an embedded battery or a replaceable battery.

At least part of those elements and components may be combined to implement operation and control of the terminal or a control method of the electronic device according to various exemplary embodiments described herein. Furthermore, the operation and control or the control method of the terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable terminal 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the terminal 100 and a wireless communication system, between the terminal 100 and another mobile terminal, or between the terminal 100 and a network where another mobile terminal (or an external server) is located, via a wireless personal area network. The short-range communication module 114 denotes a module for short-range communications.

Here, the another mobile terminal may be a wearable device, for example, a smart watch, smart glasses or a head mounted display (HMD), which is able to exchange data with the terminal 100 (or to link data with the terminal 100). The short-range communication module 114 may sense (recognize) a wearable device, which is able to communicate with the terminal 100), near the terminal 100. In addition, when the sensed wearable device is a device which is authenticated to communicate with the terminal 100 according to the present disclosure, the controller 180 may transmit at least part of data processed in the terminal 100 to the wearable device via the short-range communication module 114. Hence a user of the wearable device may use the data processed in the terminal 100 on the wearable device. For example, when a call is received in the terminal 100, the user may answer the call using the wearable device. Also, when a message is received in the terminal 100, the user can check the received message using the wearable device.

The location information module 115 is a module for acquiring the location of the terminal 100, and as a representative example, there are a Global Position System (GPS) module or a WiFi (Wireless Fidelity) module. For example, when the terminal 100 uses the GPS module, a position of the terminal 100 may be acquired using a signal sent from a GPS satellite. As another example, when the terminal 100 uses the Wi-Fi module, a position of the terminal 100 may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the terminal 100. As a module used to acquire the location (or current location) of the terminal 100, the location information module 115 may not be necessarily limited to a module for directly calculating or acquiring the location of the terminal 100.

Next, the input unit 120 may be configured to provide an audio or video signal (or information) input to the electronic device or information input by a user to the electronic device. For the input of the audio information, the terminal 100 may include one or a plurality of cameras 121. The camera 121 processes a image frame, such as still picture or video, acquired by an image sensor in a video phone call or image capturing mode. The processed image frames may be displayed on the display unit 151. On the other hand, the plurality of cameras 121 disposed in the terminal 100 may be arranged in a matrix configuration. By use of the cameras 121 having the matrix configuration, a plurality of image information having various angles or focal points may be input into the terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the terminal 100 to correspond to the input information. The user input unit 123 may include one or more of a mechanical input element (for example, a key, a button located on a front and/or rear surface or a side surface of the terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

On the other hand, the sensing unit 140 may sense at least one of internal information of the terminal 100, surrounding environment information of the terminal and user information, and generate a sensing signal corresponding to it. The controller 180 may control an operation of the terminal 100 or execute data processing, a function or an operation associated with an application program installed in the terminal 100 based on the sensing signal. Hereinafter, description will be given in more detail of representative sensors of various sensors which may be included in the sensing unit 140.

The dust sensor 143 is a sensor for detecting the number of fine dust particles or condensation nuclei floating around the terminal 100. Examples of the detection method of the dust sensor 143 include a side scattered light method, a near-infrared front scattered light method, a piezo equilibrium method, and an Owens dust method. Among them, the side scattered light method and the near-infrared front scattered light method, which are optical detection methods, are methods of detecting an amount of scattered light or the like based on a pattern of scattered light varied according to the size of particles when light is irradiated on dust particles so as to detect the number of dust particles.

Furthermore, as illustrated in FIG. 1B, the dust sensor 143 may be arranged adjacent to the illumination sensor 142 in parallel with an upper end of the bezel of the terminal 100.

Meanwhile, the dust sensor 143 may replace the proximity sensor or perform the role of the proximity sensor. The proximity sensor (not shown) refers to a sensor to sense presence or absence of an object approaching to a surface to be sensed, or an object disposed near a surface to be sensed, by using an electromagnetic field or infrared rays without a mechanical contact. Such a proximity sensor may be additionally disposed in an inner region of the terminal 100 surrounded by the touch screen as described above or in the vicinity of the touch screen, or may be replaced by the dust sensor 143 as described above. This will be described in more detail below.

The proximity sensor, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor, and output visual information corresponding to the process data on the touch screen. In addition, the controller 180 may control the terminal 100 to execute different operations or process different data (or information) according to whether a touch with respect to the same point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. On the other hands, the controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

On the other hand, the camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the terminal 100. For example, the display unit 151 may display execution screen information of an application program driven in the terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. The haptic module 153 may be implemented in two or more in number according to the configuration of the terminal 100.

An optical output module 154 may output a signal for indicating an event generation using the light of a light source of the terminal 100. Examples of events generated in the terminal 100 may include a message reception, a call signal reception, a missed call, an alarm, a schedule notice, an email reception, an information reception through an application, and the like.

A signal output by the optical output module 154 may be implemented in such a manner that the terminal 100 emits monochromatic light or light with a plurality of colors. The signal output may be terminated as the terminal 100 senses that a user has checked the generated event, for example.

The interface unit 160 serves as an interface for external devices to be connected to the terminal 100. The interface unit 160 may allow a data reception from an external device, a power delivery to each component in the terminal 100, or a data transmission from the terminal 100 to an external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

On the other hand, the identification module may be a chip that stores various information for authenticating authority of using the terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the terminal 100 via the interface unit 160.

Furthermore, the interface unit 160 may serve as a path for power to be supplied from an external cradle to the terminal 100 when the terminal 100 is connected to the external cradle or as a path for transferring various command signals inputted from the cradle by a user to the terminal 100. Such various command signals or power inputted from the cradle may operate as signals for recognizing that the terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the terminal 100 may operate in association with a web storage which performs the storage function of the memory 170 on the Internet.

Meanwhile, as aforementioned, the controller 180 may typically control the general operations of the terminal 100. For example, the controller 180 may set or release a locked state a lock state for restricting a user from inputting a control command with respect to applications when a state of the terminal 100 meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the terminal 100.

The power supply unit 190 receives external and internal power to provide power required for various components under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Hereinafter, a structure of the terminal 100 according to an embodiment of the present disclosure illustrated in FIG. 1A or the terminal in which the above-described components are disposed will be described with reference to FIGS. 1B and 1C.

Figure 1C:
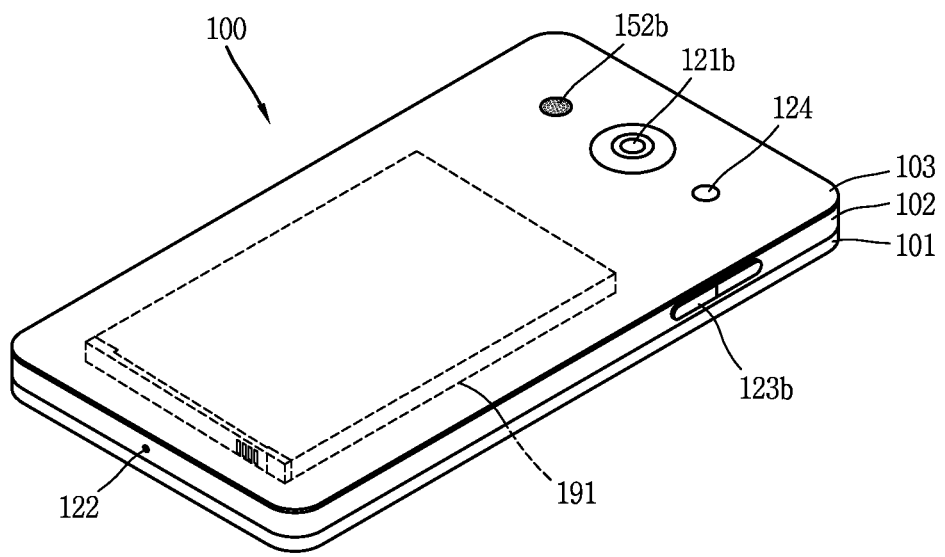

Referring now to FIGS. 1B and 1C, the terminal 100 disclosed herein is provided with a bar-shaped terminal body. However, the present disclosure may not be necessarily limited to this, and may be also applicable to various structures such as a watch type, a clip type, a glasses type, a folder type in which two or more bodies are coupled to each other in a relatively movable manner, a slide type, a swing type, a swivel type, and the like. The following description in association with a specific type of mobile terminal or on a specific type of mobile terminal will be also typically applied to another type of mobile terminal.

Here, the terminal body may be understood as a conception which indicates the terminal 100 as at least one assembly.

The terminal 100 may include a case (for example, a a body, a frame, a housing, a cover, etc.) constituting the appearance thereof. As illustrated in the drawing, the terminal 100 may include a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a back cover 103 for covering the electronic components mounted may be detachably coupled to the rear case 102. Therefore, when the back cover 103 is separated from the rear case 102, the electronic components mounted to the rear case 102 may be externally exposed.

As illustrated, when the back cover 103 is coupled to the rear case 102, a side surface of the rear case 102 may be partially exposed. In some cases, upon the coupling, the rear case 102 may also be completely shielded by the rear cover 300. On the other hand, the back cover 103 may include an opening portion for exposing the camera 121b or the audio output module 152b to the outside.

The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the terminal 100 may be configured such that one case forms the inner space. In this example, the terminal 100 having a uni-body formed in such a manner that synthetic resin or metal extends from a side surface to a rear surface may also be implemented.

On the other hand, the terminal 100 may include a waterproof portion (not shown) for preventing water from infiltrating into the terminal body. For example, the waterproof portion may include a waterproof member provided between the window 151a and the front case 101, between the front case 101 and the rear case 102, or between the rear case 102 and the back cover 103, to hermetically seal an inner space when those cases are coupled to each other.

The terminal 100 may include a display unit 151, first and second audio output modules 152a, 152b, an illumination sensor 142, a dust sensor 143, an optical output module 154, first and second cameras 121a, 121b, first and second manipulation units 123a, 123b, a microphone 122, an interface unit 160, and the like.

Hereinafter, description will be given of an exemplary terminal 100 that the display unit 151, the first audio output module 152a, the illumination sensor 142, the dust sensor 143, the optical output module 154, the first camera 121a and the first manipulation unit 123a are disposed on a front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, the foregoing configuration may not be necessarily limited to the arrangement. The foregoing configuration may be excluded, substituted or disposed on another surface if necessary. For example, the first manipulation unit 123a may not be disposed on the front surface of the terminal body, and the second audio output module 152b may be disposed on the side surface other than the rear surface of the terminal body.

The display unit 151 may display (output) information processed in the terminal 100. For example, the display unit 151 may display execution screen information of an application program driven in the terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Furthermore, the display unit 151 may be implemented in two or more in number according to a configured aspect of the terminal 100. In this case, a plurality of the display units 151 may be arranged on one surface to be spaced apart from or integrated with each other, or may be arranged on different surfaces in the terminal 100.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

In this manner, the display unit 151 may form a flexible touch screen along with the touch sensor, and in this case, the touch screen may function as the user input unit 123 (refer to FIG. 1A). Therefore, the touch screen may replace at least some of the functions of the first manipulation unit 123a. Hereinafter, for convenience of explanation, the display unit (display module) for outputting the image and the touch sensor are collectively referred to as a touch screen.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the terminal 100.

The optical output module 154 may output light for indicating an event generation. Examples of the event generated in the terminal 100 may include a message reception, a call signal reception, a missed call, an alarm, a schedule notice, an email reception, information reception through an application, and the like. When a user's event check is sensed, the controller 180 may control the optical output unit 154 to end the output of light.

The first camera 121a may process video frames such as still or moving images acquired by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the terminal 100. The first and second manipulation units 123a and 123b may employ any method if it is a tactile manner allowing the user to perform manipulation with a tactile feeling such as touch, push, scroll or the like. In addition, the first and second manipulation units 123a and 123b may also employ a method of allowing the user to perform manipulation without a tactile feeling through a proximity touch, a hovering touch, or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap with the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the terminal 100 may include a fingerprint recognition sensor for recognizing a user's fingerprint, and the controller 180 may use fingerprint information sensed through the finger recognition sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement a stereo function in conjunction with the first audio output module 152a, and may be also used to implement a speakerphone mode during a call.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 300 or a case including a conductive material may serve as an antenna.

A power supply unit 190 (refer to FIG. 1A) for supplying power to the terminal 100 may be disposed on the terminal body. The power supply unit 190 may be incorporated into the terminal body, or may include a battery 191 configured in a detachable manner on the outside of the terminal body.

The battery 191 may receive power via a power source cable connected to the interface unit 160. Also, the battery 191 may be (re)chargeable in a wireless manner using a wireless charger. The wireless charging may be implemented by magnetic induction or resonance (electromagnetic resonance).

On the other hand, the drawing illustrates that the back cover 103 is coupled to the rear case 102 for shielding the battery 191, so as to prevent separation of the battery 191 and protect the battery 191 from an external impact or foreign materials. When the battery 191 is detachable from the terminal body, the rear case 300 may be detachably coupled to the rear case 102.

An accessory for protecting an appearance or assisting or extending the functions of the terminal 100 can also be provided on the terminal 100. As one example of an accessory, a cover or pouch for covering or accommodating at least one surface of the terminal 100 may be provided. The cover or pouch may link with the display unit 151 to extend the function of the terminal 100. Another example of the accessory may be a touch pen for assisting or extending a touch input onto a touch screen.

Hereinafter, a mobile terminal of the foregoing terminal 100 will be described. In this regard, FIGS. 2A and 2B are exemplary exploded views for explaining a dust sensor included in the mobile terminal 100 associated with the present disclosure.

Figure 2A:
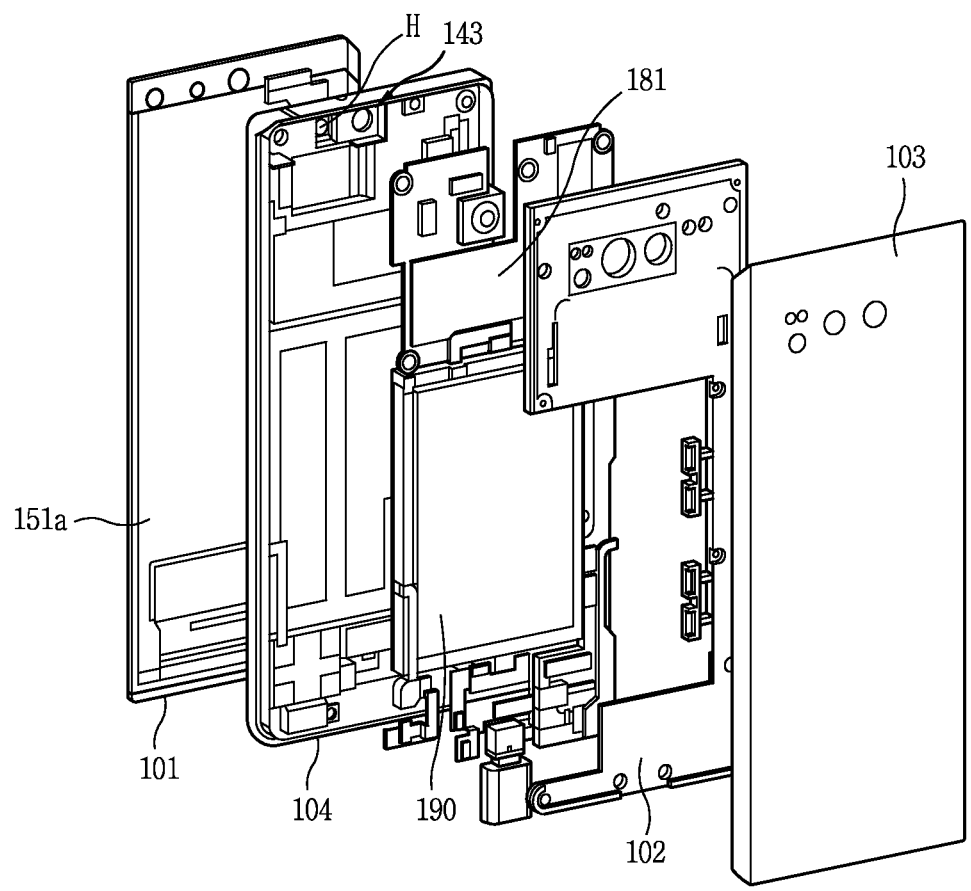
FIGS. 2A and 2B are exemplary views for explaining the structure of a dust sensor provided in a mobile terminal associated with the present disclosure.
Figure 2B:
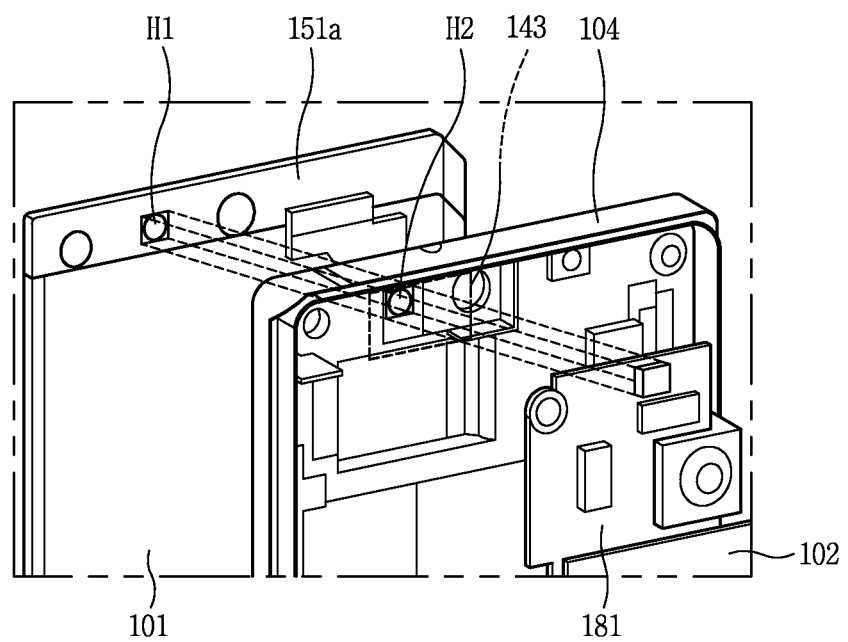

Referring to FIG. 2A, a space is formed inside the mobile terminal 100 by a front case 101 and a rear case 102, and a back cover 103 is coupled to the rear case 102. An accommodation space for mounting a battery 191 may be formed on one side of the rear case 102. Furthermore, the back cover 103 may be mounted on the rear case 102 so as to cover the battery 191.

An inner frame 104 is disposed inside the rear case 102. A display unit 151 is coupled to one side of the inner frame 104, and a circuit board 181 is provided on the other side of the inner frame 104. The circuit board 181 may be formed not to overlap with the battery 191. A plurality of electronic devices (not shown) including a drive chip (not shown) may be disposed on the circuit board 181.

The inner frame 104 is mounted between the front case 101 and the rear case 102. Furthermore, the foregoing dust sensor 143 is mounted at an upper end of the inner frame 104, and an accommodation space is provided in the inner frame 104 for this purpose. In addition, a hole is provided at an upper end of the inner frame 104 at a position of the inner frame 104 corresponding to the dust sensor 143 so that light can pass through a hole of the window 151a. Here, holes are a means for allowing light to pass therethrough and do not denote spaces or passages for the inflow of air.

The dust sensor 143 communicates with the circuit board 181 located on a back surface of the inner frame 104 to transmit a signal sensed through the dust sensor 143. The circuit board 181 may detect dust using the transmitted signal.

FIG. 2B is an enlarged view of an upper part of an exploded view of the mobile terminal 100. As illustrated in FIG. 2B, the mobile terminal 100 may be formed with holes through which light passes in a straight line on a front window 151a of the front case 101, the inner frame 104, and the circuit board 181 to sense dust floating around the terminal, and they are connected to each other in a straight line.

At this time, the hole is merely a means through which light is transmitted, and does not form an internal space for the passage or inflow for air. In other words, in the present disclosure, there is no need to design a chamber through which air flows or a passage for adjusting the path of light. In addition, in the present disclosure, dust particles may be detected without adjusting the path of emitted laser beam and scattered light returning from hit dust particles, and no rotating/moving structure is added to make the density and measurement region of the light.

The dust sensor 143 according to the present disclosure emits light emitted from a light source, for example, laser light, to an outside of the front window through the hole (H). The emitted laser light is scattered when hit dust particles, and the dust particles are detected as the reflected scattered light is received by the dust sensor 143 through the hole (H). Information on the size, distance, and number of dust particles is recognized according to the analysis of a signal corresponding to the scattered light.

In FIG. 2B, the hole (H1) located at an upper end of the front window 151a communicates with the hole (H2) disposed at an upper end of the inner frame 104. Furthermore, the dust sensor 143 is mounted adjacent to the hole (H2) of the inner frame. At this time, no space or path for changing the path of light is formed between the holes (H1, H2), and between the holes (H1, H2) and the dust sensor 143. Therefore, even when the dust sensor 143 is mounted thereon, the thickness and size of the product do not increase.

Specifically, the dust sensor 143 having a light emitting portion that emits light through the hole, and a light receiving portion that irradiates the emitted light to dust particles floating in the air, and then senses scattered light received again through the hole to generate a signal is mounted at upper end of the inner frame 104. The dust sensor 143 may be placed in an additional middle frame (not shown) or packaged in an FPCB shape according to a set structure, in order to prevent damage to components inside the terminal.

Furthermore, the dust sensor 143 may be mounted at a position where the existing proximity sensor is disposed. In addition, in the present disclosure, it is possible to implement the dust sensor 143 that performs the role of the proximity sensor through software control without adding or changing the optical design of the front window. Accordingly, it may be possible to reduce the manufacturing cost of the terminal as well as reduce the size of the hole, thereby implementing a product with a bezel-less design.

Meanwhile, the light emitting portion and the light receiving portion of the dust sensor 143 may be formed with for example, a single laser diode and a single lens. In other words, the dust sensor 143 may be configured with a single structure in which laser light emitted from one laser photodiode is emitted to an outside of the window through the lens and hole, and then light hit and scattered by dust particles is received again by the same photodiode through the hole and lens.

In addition, the dust sensor according to the present disclosure has a structure in which the laser photodiode, the lens, and the front window are arranged side-by-side in a straight line, since no additional space is required for introducing air or adjusting the optical path. At this time, the problem that the dust detection section is relatively reduced may be solved by adjusting a range of FOV (Field Of View) by software as will be described in more detail below.

A signal corresponding to scattered light received at the dust sensor 143 is transmitted to the circuit board 181 illustrated in FIG. 2B, and the controller 180 senses dust using the transmitted signal. Furthermore, the controller 180 may control a blink period of the light emitting portion of the dust sensor 143 to adjust a dust detection time or detection period.

Figure 3A:
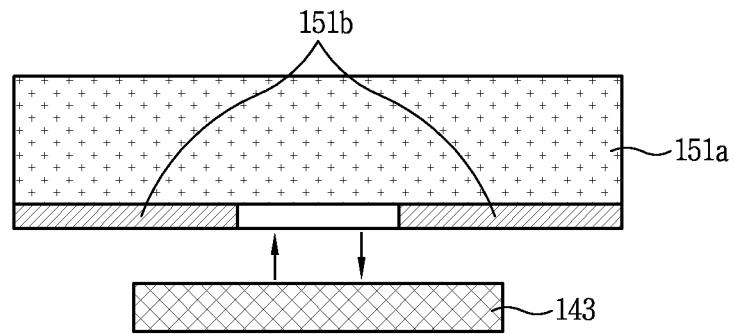
FIGS. 3A, 3B, and 3C are exemplary views for explaining another example of the structure of a dust sensor provided in a mobile terminal associated with the present disclosure.
Figure 3B:
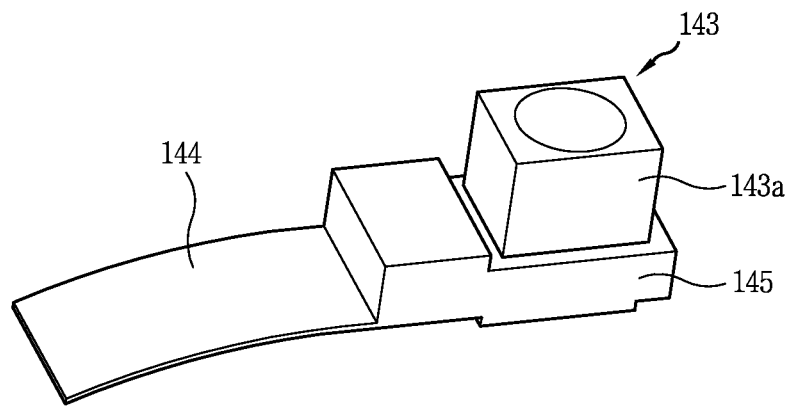
Figure 3C:
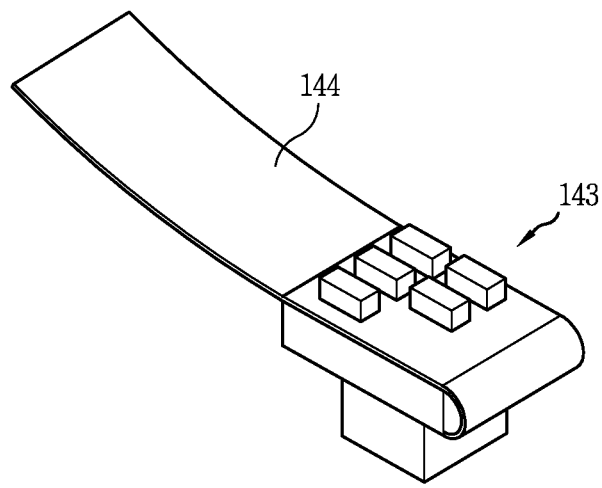

Hereinafter, FIGS. 3A, 3B, and 3C are views for explaining an exemplary structure associated with a dust sensor provided in a mobile terminal associated with the present disclosure.

FIG. 3A is an illustration implemented by deleting an existing IR coating film that has been deposited at a hole position corresponding to the dust sensor in the front window. In the terminal 100 in the related art, an IR coating film is deposited on a back surface of an upper end portion of the bezel where the proximity sensor and the illumination sensor 142 are located, that is, the front window. However, the dust sensor 143 applied to the terminal 100 according to the present disclosure uses a laser beam of approximately 850 nm band close to the visible light band and is not directly used for human irises, and thus is not against international standards even when the IR coating film is removed.

Therefore, as shown in FIG. 3A, the present disclosure may be implemented in a way that the IR coating film is removed from a hole position through which light emitted from the dust sensor 143 or received at the dust sensor 143 passes, or the IR coating film is removed from all the positions on which the dust sensor 143 and the illumination sensor 142 adjacent thereto is mounted. In the latter case, since the transmittance of visible light ray increases (by about 20%) as the IR coating film is removed, the sensitivity of the illumination sensor 142 may be further improved.

For another example, FIGS. 3B and 3C are views in which a dust sensor is implemented in a separable sub-body or modular form. Specifically, FIG. 3B is a view in which a PCB-based middle frame with an interposer between the main PCB and the sensor unit is placed, and FIG. 3C is a view in which the dust sensor is fabricated in a FPCB form according to a set structure.

For an example, in FIGS. 3B and 3C, it may be a module in which a substrate 145 is deposited on a flexible PCB/FPCB 144, and a dust sensor 143 having a laser photodiode 143a therein is deposited and formed on the substrate 145. Such a modular implementation facilitates a height design, and enables packaging implementation suitable for the bezel.

As described above, the dust sensor 143 applied to the terminal 100 according to the present disclosure is integrated into a position corresponding to the hole formed at an upper end of the front window 151a and the inner frame 104 adjacent thereto. In addition, the dust sensor has a structure in which the terminal component/case adjacent to an internal configuration of the dust sensor 143 are arranged in a straight line to emit laser light from the light emitting portion of the dust sensor 143, for example, the laser photodiode 143a, in a straight line without changing the path.

Figure 4:
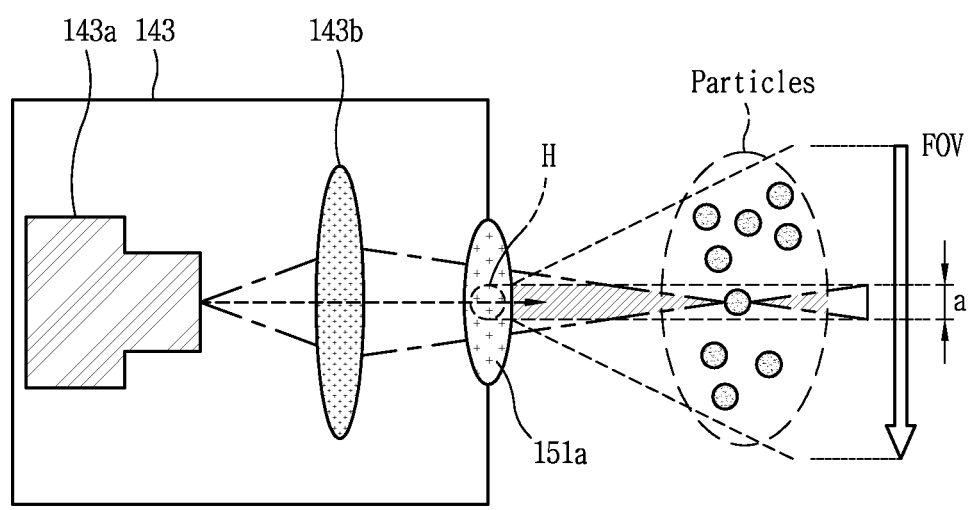
FIG. 4 is a conceptual view for explaining a software implementation operation for extending a dust detection section according to the structure of a dust sensor provided in a mobile terminal associated with the present disclosure.

FIG. 4 is a conceptual view for explaining a software implementation operation for extending a dust detection section in a dust sensor having such a structure.

First, the structure of a dust sensor according to the present disclosure may include a light source unit (e.g., Laser+PD 143a) for emitting light, a lens 143b for condensing light, and an outer cover window, and the size/number/movement speed of dust particles existing in a certain range outside the terminal may be detected based on the intensity, quantity, and number of scattered light reflected and returned from dust particles hit by the emitted laser beam.

In this regard, a method of detecting the size and the number of dust particles in the mobile terminal according to the present disclosure will be described in detail based on a pulse output signal illustrated in FIGS. 5A and 5B.

The laser light emitted from the light source 143a senses the scattered light returned from dust particles hit by laser light emitted from the light source unit 143a to generate a pulse output signal. The controller 180 determines the size, number and movement speed of dust particles using the width, number, and time difference of the pulse output signal generated in real time. For example, when scattered light is incident on the light source 143a, the controller 180 may recognize the boundary and size of dust particles according to the quantity and intensity of scattered light. In this regard, FIG. 5A is a view for explaining the detection of a single dust particle and FIG. 5B is a view for explaining the detection of a plurality of dust particles.

Figure 5A:
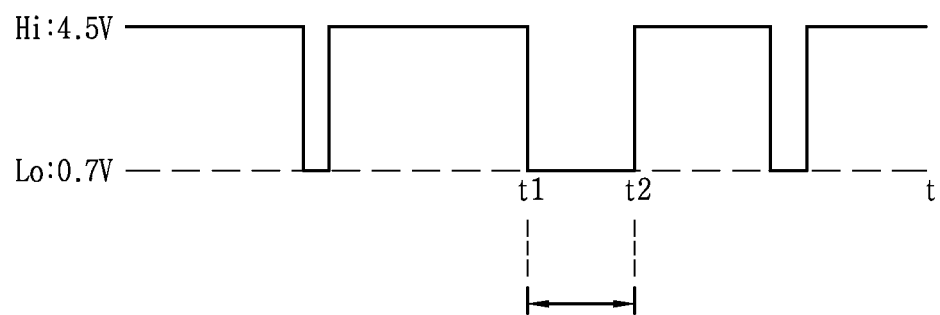
FIGS. 5A and 5B are views for explaining a method of detecting the size and number of dust particles in a mobile terminal associated with the present disclosure.
Figure 5B:
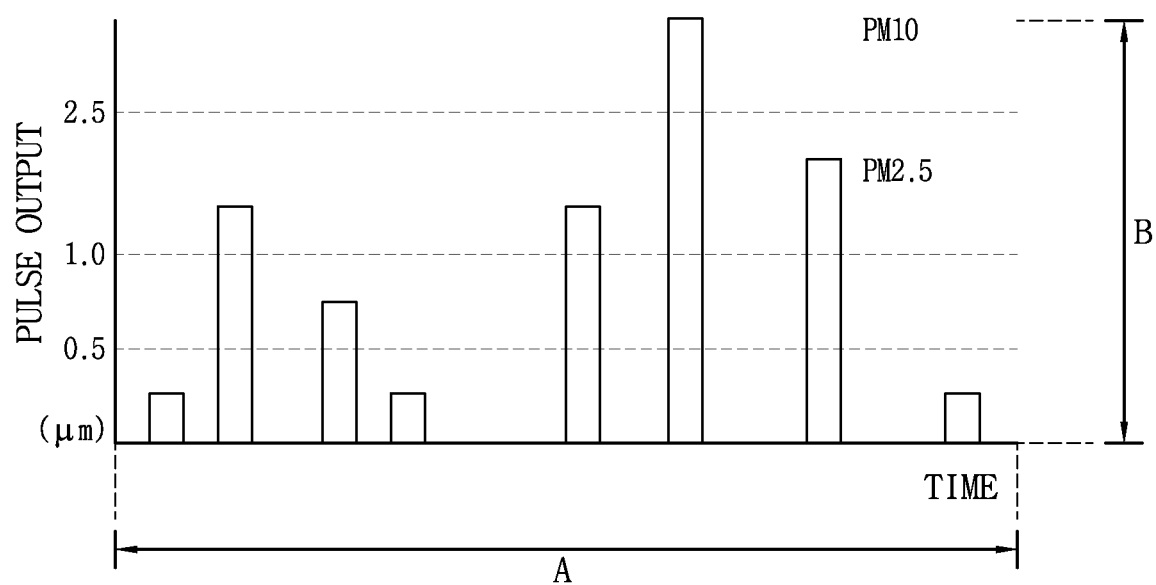

A high voltage of about 4.5 V is output when no dust particles are detected from the pulse output signal of FIG. 5A, and a low voltage of about 0.7 V is output when dust particles are detected. At this time, a timing period (t1 to t2) in case where the dust particles are detected correspond to the size and speed of the detected dust particles. In the pulse output signal graph of FIG. 5B, a number of pulses in the X direction (A) corresponds to a number of the detected dust particles, and a pulse width in the Y direction (B) corresponds to a size of the detected dust particles.

Referring again to FIG. 4, in the present disclosure, since only dust passing through region 'a' is detected using the straightness of laser light, it is not required to use a conventional refractive lens (for example, uMirror). Due to this, it may be possible to implement a miniaturized dust sensor, and an additional space is not required inside the terminal 100, and a small-sized hole is implemented since the size of the hole is also sufficient for the diameter of the region 'a'. Furthermore, the front window 151a is usually used when using a light source, and corresponds to a fixed structure for making a light density and a measurement region, and thus no additional design is required.

Therefore, there is a disadvantage in that the thickness and size of the component are reduced to implement a bezel-less design, while having an advantage in that the dust detection section (or range) is also reduced accordingly.

Specifically, in FIG. 4, laser light emitted from the light emitting portion 143a of the dust sensor 143 is condensed through the lens 143b and then emitted to the outside through the hole (H) of the window 151a. Therefore, an actual detection period in which dust particles floating in the air are detected is very small for the region 'a'. In such a case, the accuracy of dust concentration detection for determining the comfort of the air deteriorates.

In order to solve this problem, the controller 180 of the terminal 100 according to the present disclosure may change a light blink period of the light source unit 143a according to the size, number, and movement speed of the detected dust, and detect dust with a detection period corresponding to the changed blink period to extend the dust detection range. For example, although the actual dust detection period is limited to the region 'a', the dust detection time and/or detection period for the region 'a' is adjusted to allow a software design such as detecting dust within the extended FOV range.

Specifically, the dust detection time for the region 'a' is increased to allow a software design change with a wide FOV range. In other words, the controller 180 may adjust an operation time of the dust sensor 143 to adjust a size of the detection section. At this time, a condition for adjusting an appropriate operation time may be preset or changed. To this end, the controller 180 may operate to set a plurality of dust concentration levels in advance, calculate a dust concentration level that matches the detected dust, and determine an operation time corresponding thereto. At this time, the dust concentration level may be set in proportion to the number and size of the detected dust particles.

In addition, the controller 180 may increase the dust detection time such that the further extended reference range, that is, FOV range, increases as the determined dust concentration level increases.

Figure 6A:
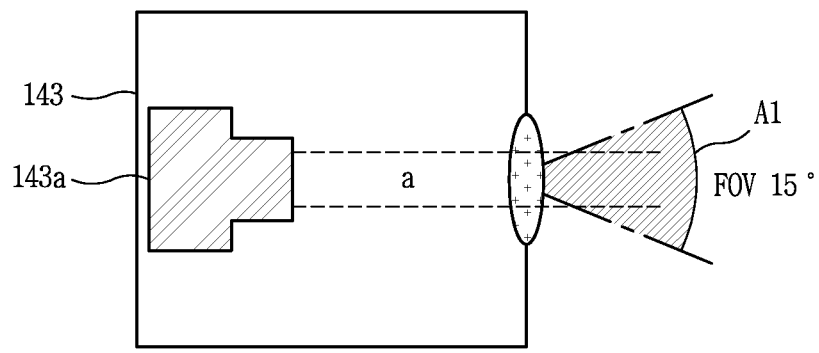
FIGS. 6A, 6B and 6C are conceptual views for explaining an implementation operation for changing a dust detection section in software in a mobile terminal associated with the present disclosure.
Figure 6B:
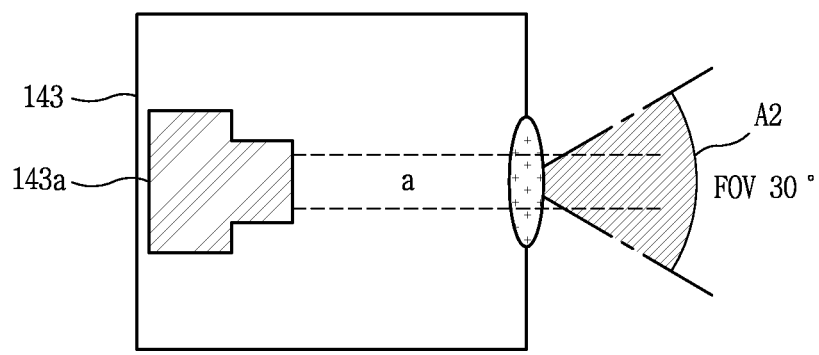
Figure 6C:
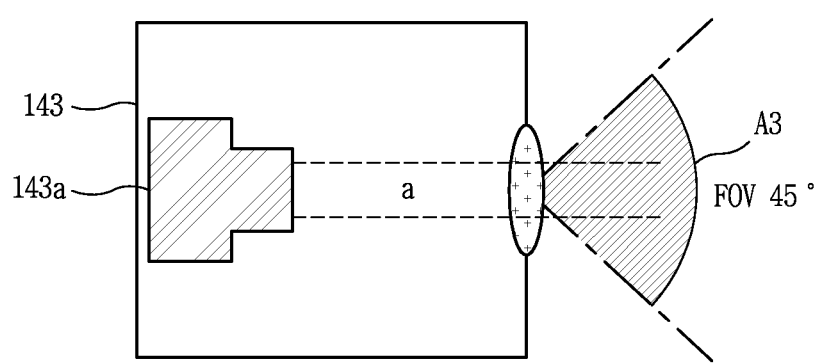

For an example, FIG. 6A shows a case where the dust sensor 143 is driven for about 3 seconds when the dust concentration level is 1 ("good", about 0-12 μg/m3) to detect dust within the FOV 15° range (A1). FIG. 6B shows a case where the dust sensor 143 is driven for about 5 seconds when the dust concentration level is 2 ("normal", about 12.1-35.4 μg/m3) to detect dust within the FOV 30° range (A2). FIG. 6C shows a case where the dust sensor 143 is driven for about 7 seconds when the dust concentration level is 3 ("bad", about 35.5-55.4 μg/m3) to detect dust within the FOV 45° range (A3).

When the dust concentration level is low, it may be possible to reduce the consumption current due to the operation (light emission) of the dust sensor 143 by decreasing the operation time of the dust sensor 143 and increasing the detection period. On the contrary, when the dust concentration level is high, it may be possible to improve the accuracy of dust concentration detection by increasing the operation time of the dust sensor 143 and decreasing the detection period.

For example, when the size of the dust is large and the dust concentration level is high, the controller 180 may decrease the light blink period of the dust sensor 143 and decrease the detection period so as to correspond thereto.

For the operation time and the detection period of the dust sensor, the dust concentration level and the optimum operation time (and the detection period) corresponding thereto may be stored in advance in the memory 170 in the form of a table in order to balance the conflicting needs of dust concentration detection accuracy and consumption current reduction. The values stored in the memory 170 may be changed or initialized through user input.

On the other hand, in the present disclosure, whether to adjust the dust detection time and the detection period using a fixed reference FOV range or whether to adjust the dust detection time and the detection cycle to have a variable FOV range according to a situation may be selectively applied through software implementation.

According to an embodiment, the extension of the FOV range is not necessarily proportional to the performance of dust detection, and the more the FOV range is increased, the more the consumption current is increased. Therefore, in order to reduce the battery consumption current, the dust detection time and detection period may be varied based on the fixed reference FOV range.

Specifically, the controller 180 may calculate the movement speed of dust passing through the dust detection section using a signal (for example, a pulse output signal) generated in real time through the dust sensor 143 at first, and variably apply the detection time according to the movement speed of the dust calculated to detect the dust within the reference FOV range (i.e., the reference FOV range).

As described above, an optimized dust detection time corresponding to the moving speed of the dust particles may be applied to implement the operation of the dust sensor with minimized consumption current while satisfying the dust concentration detection performance.

Figure 7A:
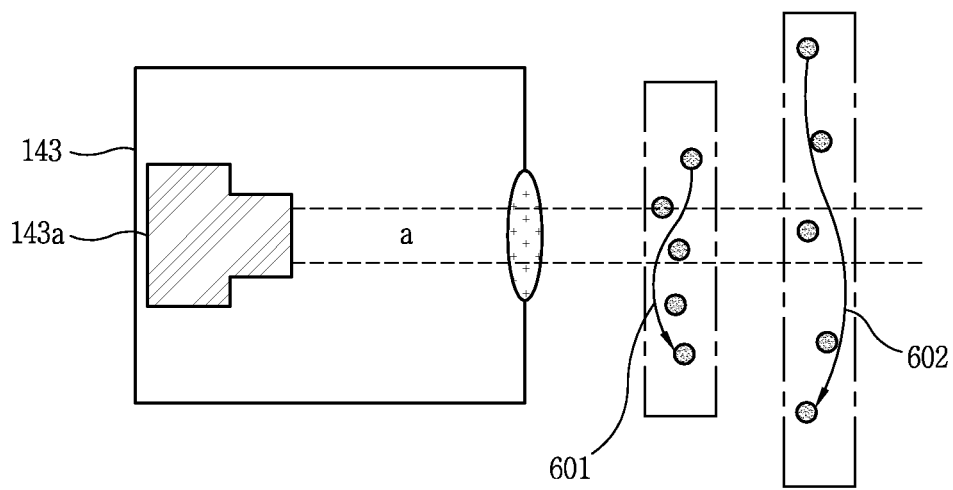
FIGS. 7A, 7B, and 7C are exemplary conceptual views for explaining that a light blink period and a dust detection time are applied differently according to a movement speed of the detected dust particles in a mobile terminal associated with the present disclosure.
Figure 7B:
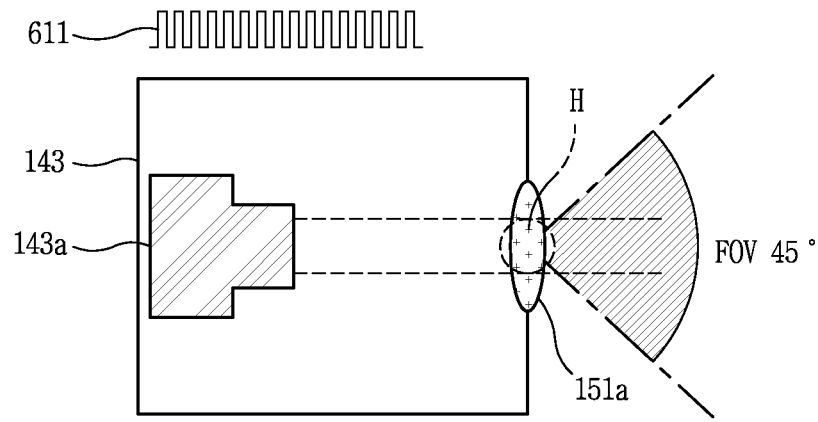
Figure 7C:
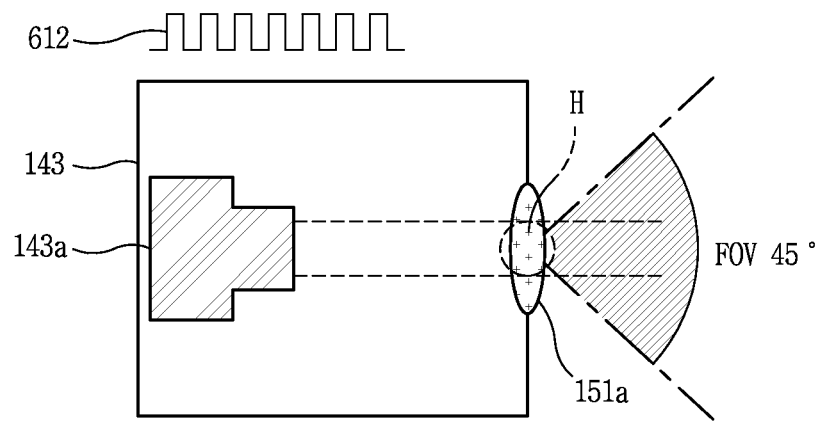

For example, FIGS. 7A, 7B, and 7C are exemplary conceptual views for explaining that a light blink period and a dust detection time are applied differently according to a movement speed of the detected dust particles in a mobile terminal associated with the present disclosure. In FIG. 7A, it is assumed that there are dust particles 602 quickly passing through the region 'a' and dust particles 601 more slowly passing therethrough.

At this time, the movement speed of dust particles passing through the region 'a' may be calculated in real time through an existing algorithm using an arrival time difference of scattered light reflected and received by hitting dust particles and the size and distance information of dust particles according to light intensity. Next, it may be possible to adjust the light blink period (or light wavelength period) and the detection time of the light source unit of the dust sensor based on a known algorithm according to the calculated movement speed to implement a fixed FOV (for example, 45 degrees).

For an example, in the case of dust particles 602 passing quickly through the region 'a', as illustrated in FIG. 7B, the wavelength period 611 (i.e., light blink period) of laser light emitted from the dust sensor 143 is changed to be short above a reference value, and the dust detection time is changed to be short. Accordingly, the dust particles 602 may be detected in the fixed FOV range (e.g., 45 degrees).

Meanwhile, in the case of dust particles 601 passing slowing through the region 'a', as illustrated in FIG. 7C, the wavelength period 612 (i.e., light blink period) of laser light emitted from the dust sensor 143 is changed to be long below a reference value, and the dust detection time is changed to be long. Accordingly, while the dust particles 601 is detected in the fixed FOV range (for example, 45 degrees) as in FIG. 7B, and the consumption current may be reduced.

Furthermore, since the battery consumption current increases as the dust detection time matching the movement speed of dust increases, the controller 180 controls the light blinking period of the dust sensor 143 to be slowed down to reduce the battery consumption current. For this purpose, the controller 180 sets a maximum value of the dust detection time in advance, and when the dust detection time exceeding the maximum value is calculated as a result of the comparison, the controller 180 may adjust the light blink period of the dust sensor 143 to be slow.

According to another embodiment, the dust detection time and the detection period may be adjusted to have a variable FOV range in consideration of the remaining battery capacity of the terminal 100. The related implementation method is similar to the foregoing description with reference to FIGS. 6A through 6C.

For example, when the remaining capacity of the battery is less than a reference value, it may be possible to minimize the amount of current consumed due to the operation of the dust sensor 143 by reducing the dust detection time and slowing down the detection period. For another example, when the remaining battery capacity is sufficient, the dust detection time and the detection period may be adjusted differently to detect dust within a FOV range varied according to the dust concentration level, thereby performing more accurate dust concentration detection in an environment having a high dust concentration level.

According to another example, it may be possible to select a normal measurement mode and a precision measurement mode, and perform a normal measurement mode in response to user's feedback, or selectively perform a precision measurement mode to detect dust within a further extended FOV range by increasing the dust detection time even when the battery consumption is increased. However, as the FOV range increases, the performance of the dust concentration detection may not be improved in proportion, and thus the maximum value of the FOV range may be set in advance.

Figure 8A:
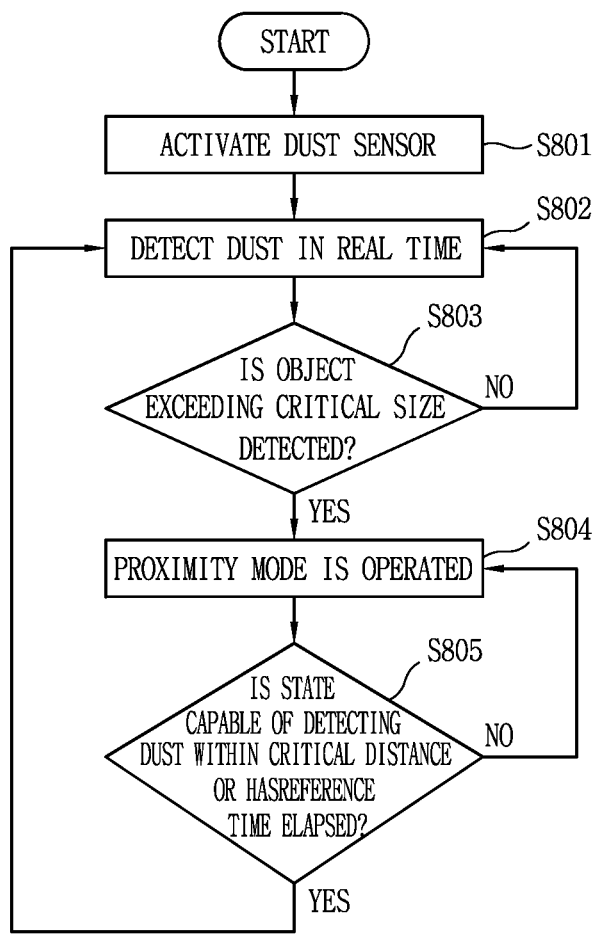
Figure 9:
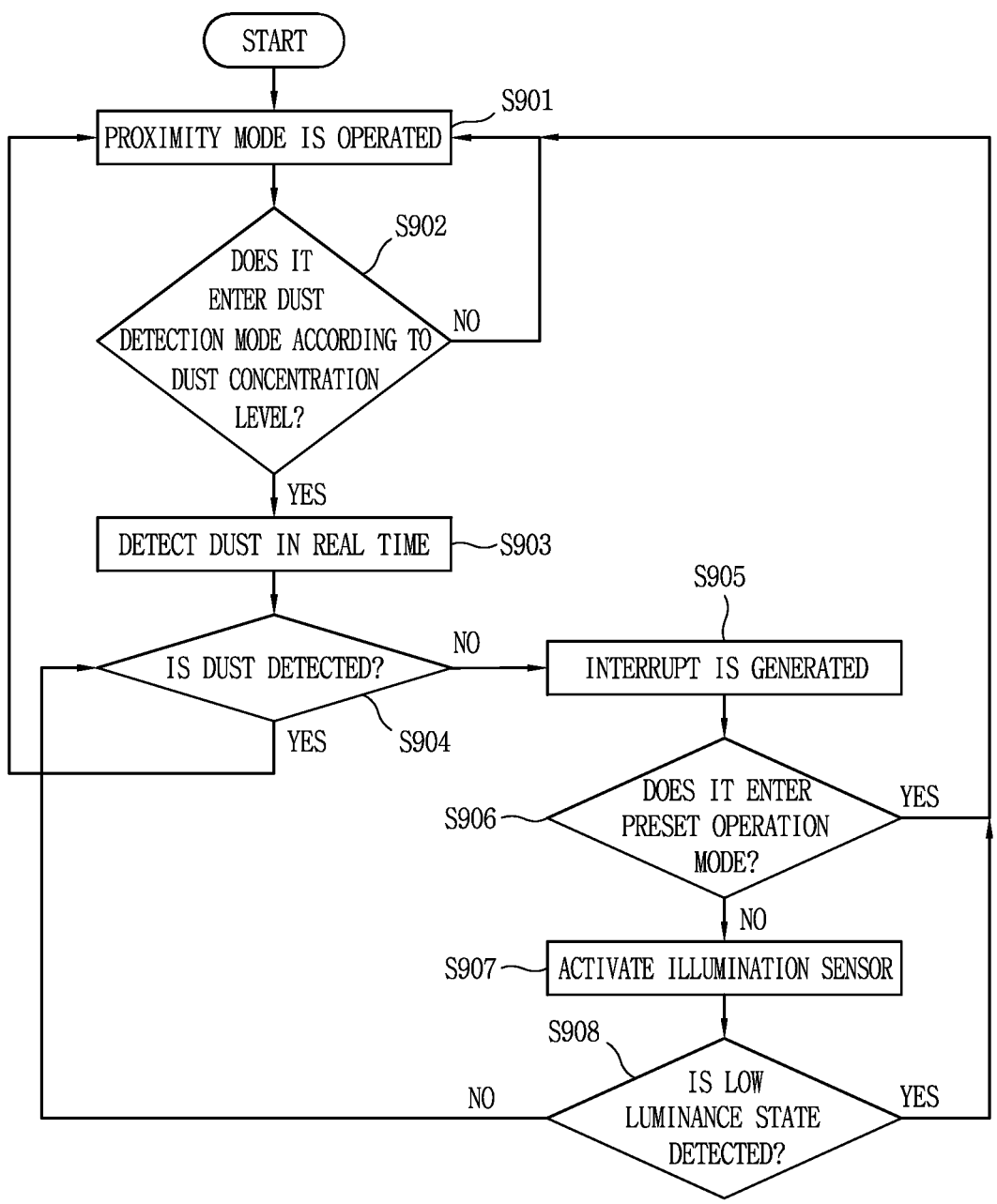

FIGS. 8A, 8B and 9 are different flowcharts for explaining an operation method for replacing a dust sensor of a mobile terminal associated with the present disclosure with a proximity sensor. In the present disclosure, the existing hardware proximity sensor may be removed to replace the proximity sensor through the dust sensor 143 as described above. It is required to implement an operation for preventing a function collision between the proximity sensor and the dust sensor 143.

In this regard, referring to FIG. 8A, the process (S801) of activating the dust sensor by a control signal generated by the controller 180 is started. Here, the control signal may be generated through a user input or generated in conjunction with the operation of a specific function. In the latter case, the dust sensor may be activated in conjunction with the operation of turning on the display unit 151 as an example.

Dust around the mobile terminal is detected in real time according to the activation of the dust sensor (S802). The controller 180 of the terminal 100 may recognize whether an object exceeding the critical size is detected (S803) while detecting the dust. In response to the detection state, the dust sensor operates in a proximity mode (S804). Here, the proximity mode denotes that an operation of detecting the proximity of an object through the dust sensor (hereinafter, referred to as a "second operation") is carried out.

Subsequently, in response to the determination that dust detection within a critical distance is allowed while performing a second operation mode, or whether a preset period of time has elapsed (S805), the controller 180 stops the second operation and performs an operation mode (hereinafter, referred to as a "first operation") for sensing dust again through the dust sensor. Here, the preset period of time denotes a period of time which is long enough that the proximity of an object in the operation mode is no longer required to be sensed or can be seen as the release of a proximity state of the object. Through the implementation, it may be possible to perform a function without collision between the dust sensor and the proximity sensor.

For another operational implementation method, referring to FIG. 8B, as the dust sensor 143 of the terminal 100 is activated (S811), dust is detected in real time (S812), and while detecting the dust, the controller 180 may sense that the terminal 100 has entered a preset operation mode (S813). In operation S814, as the entry into a preset operation mode is detected, a second operation mode in which the proximity of an object is detected through the dust sensor is carried out.

Here, the preset operation mode may include, for example, a case in which a call is carried out, a case in which an operation mode additionally requiring proximity sensing is executed when a user is carrying the terminal through a proximity acceleration sensor or the like, and the like.

Subsequently, when it is determined that the preset operation mode is ended (S815), the process returns to step S812 to perform a first operation mode for detecting dust in real time again.

In addition, although not shown, the light blink period and the sensing period of the dust sensor may be changed to be different from the previous one in order to prevent collision between the first operation mode and the second operation mode.

For another example, referring to the operational implementation of FIG. 9, a default setting or a proximity mode is fixedly carried out (S901), and it is determined whether to enter the dust detection mode according to the dust concentration level detected during the proximity mode (S902). When the dust concentration level is detected to be higher than a reference level, a first operation mode for detecting dust in real time may be carried out (S903). At this time, the first operation mode may be carried out in a precise measurement mode according to a dust concentration level detected during the proximity mode, that is, by adjusting the dust detection time to be higher and the detection period to be lower than the reference value. Alternatively, it may be possible to detect dust sensed through the dust sensor at a predetermined detection interval for a predetermined dust detection period of time.

When it is determined that the dust detection measurement is completed (S904), the process returns to step S901 to perform a proximity mode operation. On the contrary, when an interrupt is generated during the dust detection (S905), it may be possible to perform the process of sensing whether the foregoing predetermined operation mode has been entered (S906). Here, the interrupt may denote interrupting the first operation mode, as state detection which is difficult to perform the first operation mode. As an example, this may correspond to a case when the foregoing predetermined operation mode is entered, or when the proximity of an object exceeding a critical size is detected or a call is performed.

As a result of the determination in step S906, when the occurrence of the interrupt does not correspond to entry into a preset operation mode, the illumination sensor 142 provided in the mobile terminal is activated (S907) to detect a low illuminance state below a reference value (S908). Here, the low illuminance state corresponds to a case where an illuminance value less than a reference value is detected. For example, the low illuminance state may include a case where the terminal is placed in a position, a posture (e.g., terminal overturn), a state (e.g., clogging of the dust sensor hole), or such a place (e.g., putting in a pocket, bag or the like) disallowing the measurement of dust concentration.

When it is not in the low illuminance state, the first operation mode (S903, S904) that has been interrupted is executed. On the contrary, when the low illuminance state is detected, the process returns to step S901 to perform a proximity mode operation (S901).

As described above, the structure of the dust sensor applied to the terminal 100 according to the present disclosure, the software implementation for extending/changing the dust detection section in this structure, and the implementation operation for preventing collision between the dust sensor and proximity sensor functions in parallel have been described. Hereinafter, various embodiments using environment information such as detected dust concentration or the like will be described in detail.

FIGS. 10A, 10B, 11A, 11B, 12A, 12B, 12C, 12D, 13, 14A, 14B, 14C, 15A, 15B, 15C, 16A, 16B, 16C, 16D, 17A, 17B, 17C, 17D, 18A, 18B, 18C, 19A and 19B illustrate various UIs/UXs that use dust information detected through the dust sensor of the mobile terminal associated with the present disclosure.

First, FIGS. 10A through 13 illustrate embodiments associated with a method of sharing dust information detected using the dust sensor with a third party. Here, the dust information denotes a dust concentration level or a detected dust concentration value.

Figure 10A:
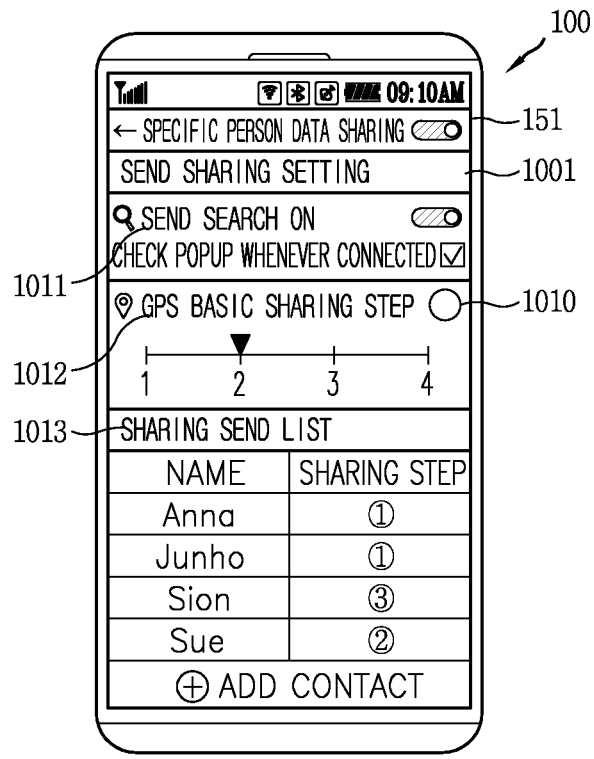
FIGS. 10A, 10B, 11A, 11B, 12A, 12B, 12C, 12D, 13, 14A, 14B, 14C, 15A, 15B, 15C, 16A, 16B, 16C, 16D, 17A, 17B, 17C, 17D, 18A, 18B, 18C, 19A and 19B are views associated with various embodiments that use dust informa-
Figure 10B:
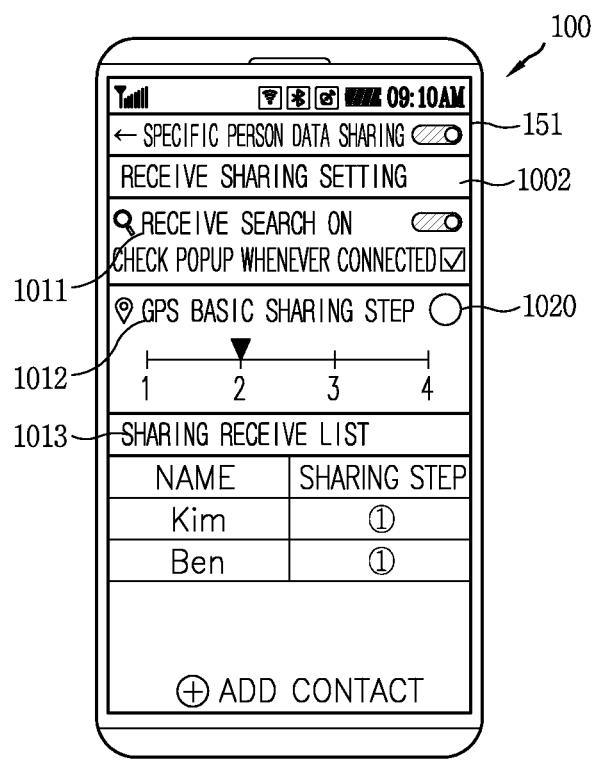

FIG. 10A is a setting screen 1001 associated with transmitting detected dust information to a specific person, and FIG. 10B is a setting screen 1002 associated with receiving dust information from a third party. The controller 180 of the mobile terminal 100 according to the present disclosure may control dust information detected through the dust sensor 143 having the above-described structure to be displayed on the display unit 151. Furthermore, the controller 180 may transmit a signal corresponding to the dust information displayed on the display unit 151 to an external terminal through the wireless communication unit 110 in response to the reception of a sharing request signal.

The setting for the sending/receiving of dust information sharing may be turned on or off through the operation of a first item 1011 on the setting screens 1001, 1002 of FIGS. 10A and 10B. The user may usually deactivate the sending/receiving of dust information sharing to disable unnecessary sharing of data. In addition, the process of sharing GPS information may be set based on a touch input to a second item 1012. Here, the GPS information sharing may be divided into, for example, a first to a fourth steps, and personal privacy may be protected by differently setting a GPS information sharing step. The set GPS information sharing may be displayed in the form of icons 1010, 1020.

Next, third party information sharing the dust information may be checked through a sharing send/receive list, which is a third item 1013. A user may select Add Contact at the bottom of the third item 1013 to add a new contact to the sharing send/receive list. Specifically, when the user selects Add Contact in FIG. 10B, the contact list of the counterpart that has turned on sharing receive of dust information in the contacts stored in the mobile terminal is selectably displayed. When a specific contact is selected, a popup notification for checking whether or not a sharing request is approved is displayed on the counterpart terminal, and the sharing send/receive list is updated based on a feedback response received from the counterpart. Thus, air quality information of various places may be checked in a more quick and accurate manner by monitoring dust information around a specific person in real time.

Figure 11A:
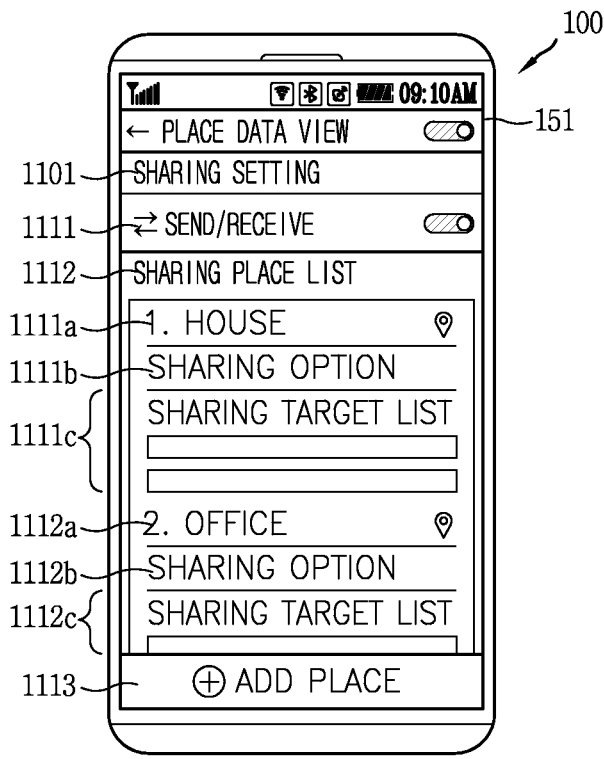
Figure 11B:
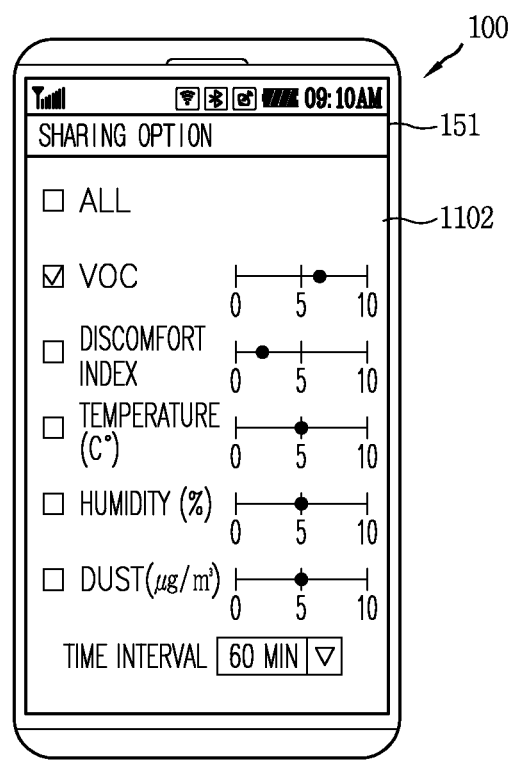

FIGS. 11A and 11B show a condition setting screen for using dust information more effectively by limiting all dust information detected by a specific person, for example, to a specific place or a specific time period without sharing all the dust information.

In this regard, the controller 180 of the terminal 100 according to the present disclosure detects entry into a designated place using location information detected through the location information module 111. In addition, the controller 180 transmits dust information corresponding to dust detected through the dust sensor 143 to an external terminal matching a designated contact. In other words, a condition is imposed that dust information detected in real time is not transmitted or received in real time, but only dust information detected at the designated place is shared. At this time, duplicated sharing information is ignored or updated based on the latest time.

A send/receive item 1111 of dust information, and a sharing place list item 1112 including sharing options 1111b, 1112b and sharing target lists 1111c, 1112c for each of set places 1111a, 1112a may be displayed on the setting screen 1101 illustrated in FIG. 11A. Furthermore, an add place button 1113 may be provided at the bottom of the setting screen 1101. On the other hand, when the sharing option 1111b or 1112b is selected on the setting screen 1101, setting for sharable environment information (e.g., VOC, discomfort index, temperature and humidity, dust concentration, etc.) and setting of a numerical value for regarding it as redundant data may be carried out. Furthermore, it may be also possible to set a collection time interval (e.g., 60 minutes) of environment information.

On the other hand, option items displayed on a sharing option screen 1102 illustrated in FIG. 11B may vary depending on the type and current status of sensors installed in the mobile terminal 100 or the terminal of the third party. When the shared data is a value within a range set on the sharing option screen 1102 in FIG. 11B, it is regarded as redundant data and ignored, and when the shared data is data out of the set range, the previously shared data is updated.

FIGS. 12A through 12D show examples of a setting screen and a notification screen for sharing environment information with a sharing target device connected to the same WiFi when entering a designated specific place. Environment information may be shared with a sharing target device connected to the same WiFi or BT for each designated place (e.g., house, car, etc.) through the setting screen 1201 of FIG. 12A.

Figure 12A:
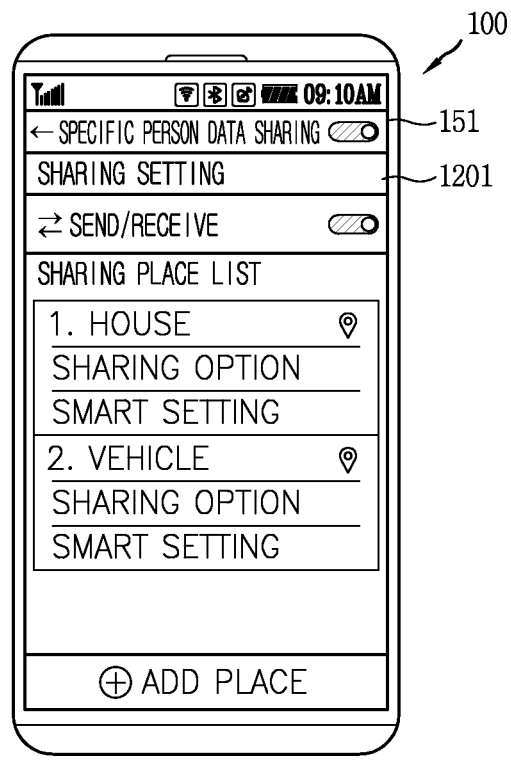
Figure 12B:
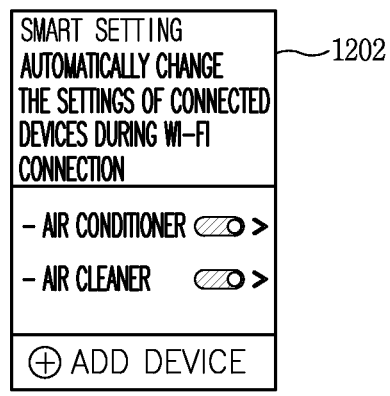
Figure 12C:
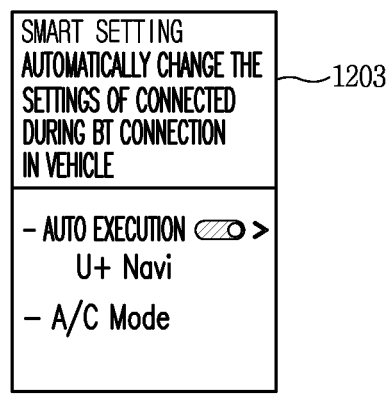
Figure 12D:
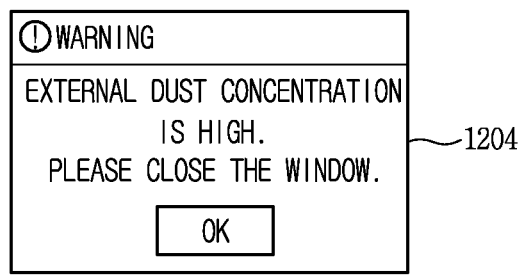

When a smart setting item is selected on the setting screen 1201 in FIG. 12A, an application (e.g., an air conditioner, an air purifier control app, etc.) to be automatically executed at the time of WiFi connection at home may be set through the screen 1202 of FIG. 12B. Alternatively, as shown in the screen 1203 of FIG. 12C, an application and an operation mode (e.g., navigation, A/C mode, etc.) to be automatically executed when BT is connected in the vehicle may be set. FIG. 12D shows an example in which external environment information received through GPS sharing information is compared with dust concentration measured in the room to output notification information 1204.

Figure 13:
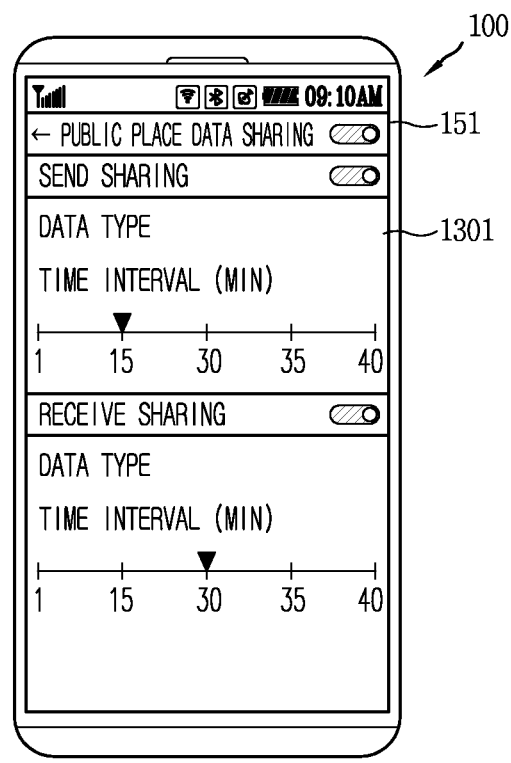

For another example, FIG. 13 shows an example of a setting screen 1301 for sharing environment information among a plurality of users who have set environment information sharing in a public place (e.g., restaurant, subway, bus, public institution, etc.). As illustrated in the drawing, the sending/receiving of environment information in a public place may be set differently, and the type of data to be shared and the update time interval may be set respectively.

Hereinafter, FIGS. 14A through 15C show various examples in which the shared dust concentration and/or environment information is displayed on the display unit 151.

Specifically, first, a map screen displayed with first dust information corresponding to dust detected through the dust sensor 143 of the mobile terminal 100 is displayed on the display unit 151. Furthermore, the controller 180 controls the display unit 151 to display second dust information received within a preset period of time from an external terminal, that is, shared dust information, at the corresponding position on the map screen. At this time, when the shared dust information is selected on the map screen, a sharing history of the second dust information received from the corresponding position may be provided.

Figure 14A:
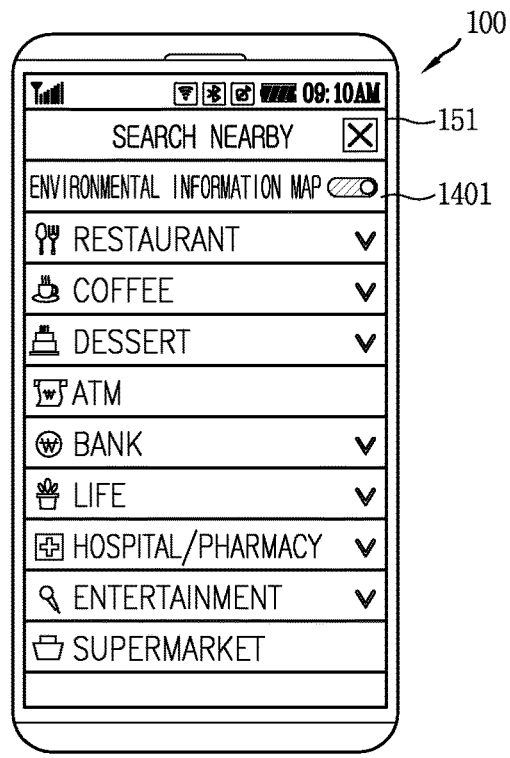
Figure 14B:
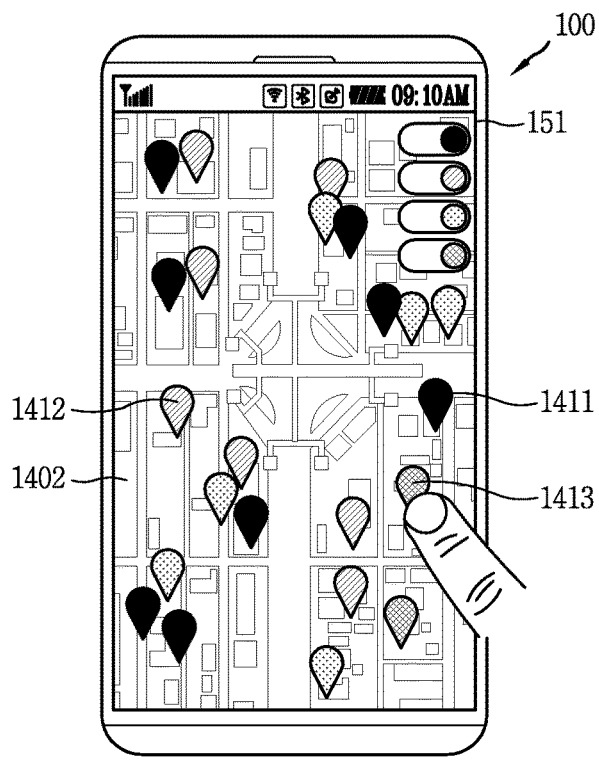

For an example, an environment information map may be checked between the sharers of screen information as illustrated in FIG. 14A. When an environment information option is selected in the environment information map, the information of a public place in which the environment information is shared may be checked on the map screen 1402 as illustrated in FIG. 14B. At this time, on the map screen 1402, environment information may be displayed in a distinguished manner for each business type illustrated in FIG. 14A, and displayed with color objects or emoji-shaped graphic objects 1411, 1412, 1413 that are visually intuitive based on shared dust concentration levels. For example, a place where the graphic object 1411 with a dark color is displayed may be intuitively understood to have a higher dust concentration level than a place where the graphic object 1412, 1413 is displayed. In addition, the graphics objects 1411, 1412, 1413 may be changed differently depending on a set time interval or as the dust concentration level is updated in real time.

Figure 14C:
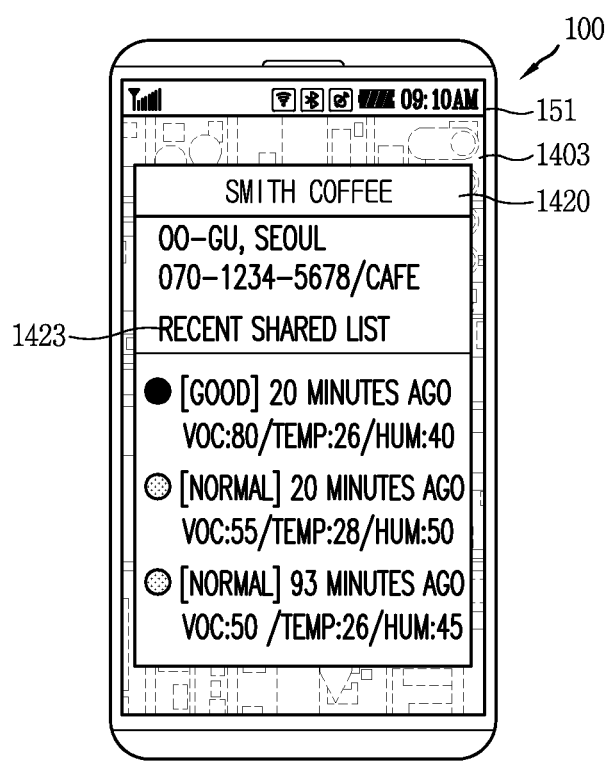

When one 1413 of the displayed graphic objects is selected, a screen 1403 for checking a sharing history 1423 of the dust concentration level or environment information shared in the relevant place 1420 is provided as illustrated in FIG. 14C.

Figure 15A:
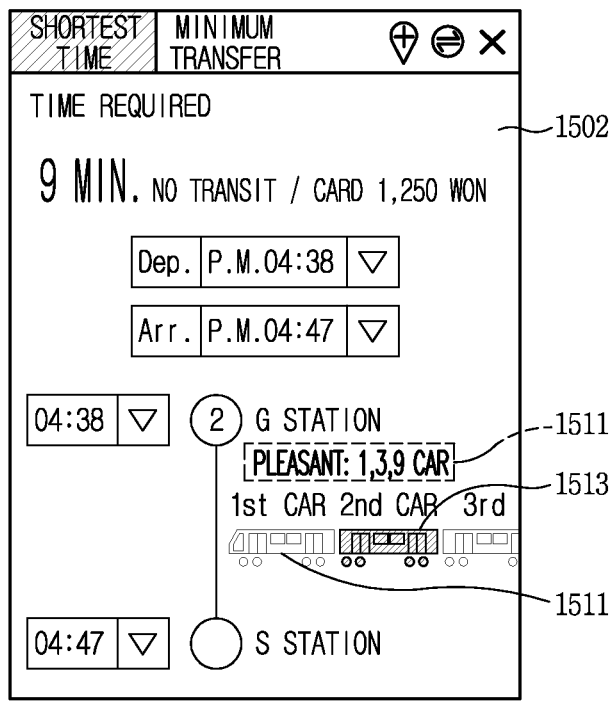
Figure 15B:
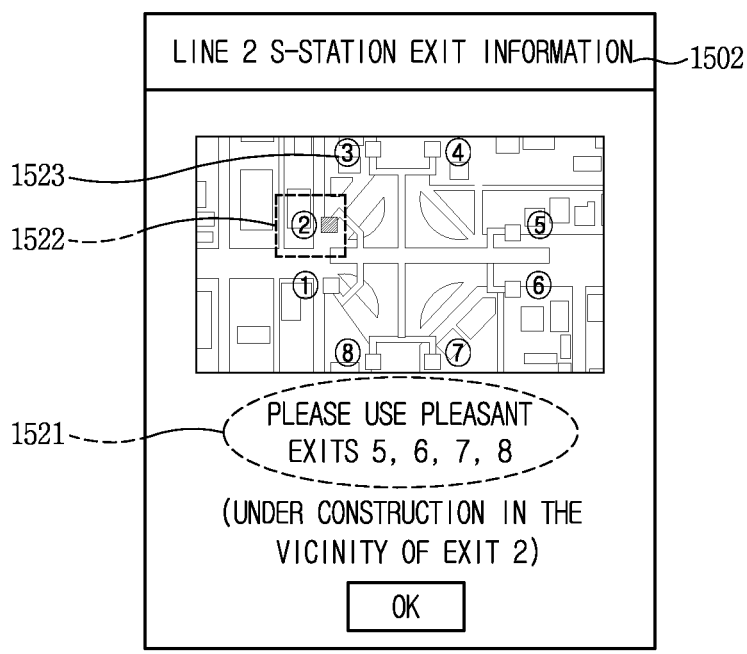
Figure 15C:
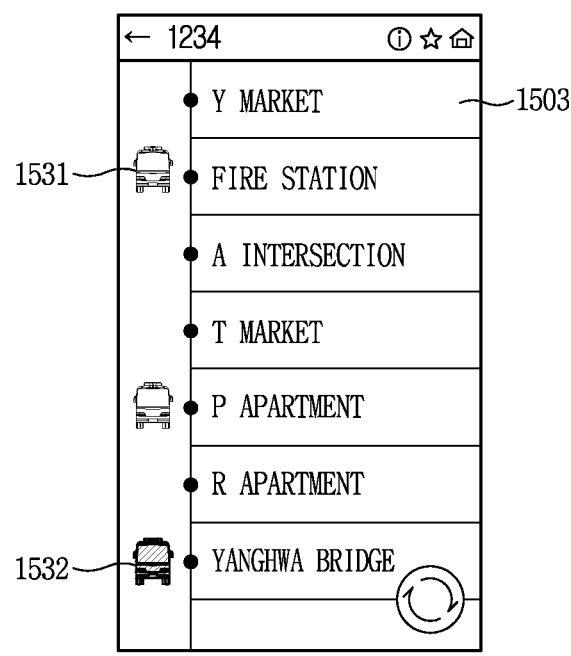

FIGS. 15A through 15C are examples of providing real-time monitoring results of environment information (air quality, gas, dust, etc.) that are shared when using public transportation such as subways, buses, and the like through the display unit 151. Specifically, as shown on a screen 1501 illustrated in FIG. 15A, environment information shared by each carriage of a subway train may collected and displayed in the form of color image objects 1512, 1513 indicating pleasant carriage information 1511 and air quality for each carriage location. Specifically, as shown on a screen 1502 illustrated in FIG. 15B, environment information shared by each subway exit may be collected and displayed in the form of color image objects 1522, 1523 indicating pleasant exit information 1521 and air quality for each exit location. Alternatively, as shown on a screen 1503 illustrated in FIG. 15C, a color indicating air quality may be displayed for each of the images 1531, 1532 of buses approaching a stop. Thus, information on air quality can be visually immediately checked.

For another embodiment, FIGS. 16A through 17D show examples associated with displaying detected dust information in an AOD (Always On Display) operation mode like time information or weather information.

Figure 16A:
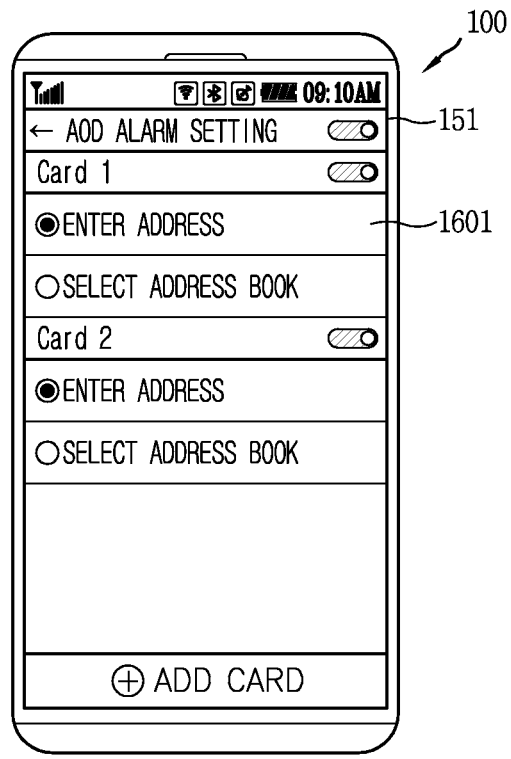
Figure 16B:
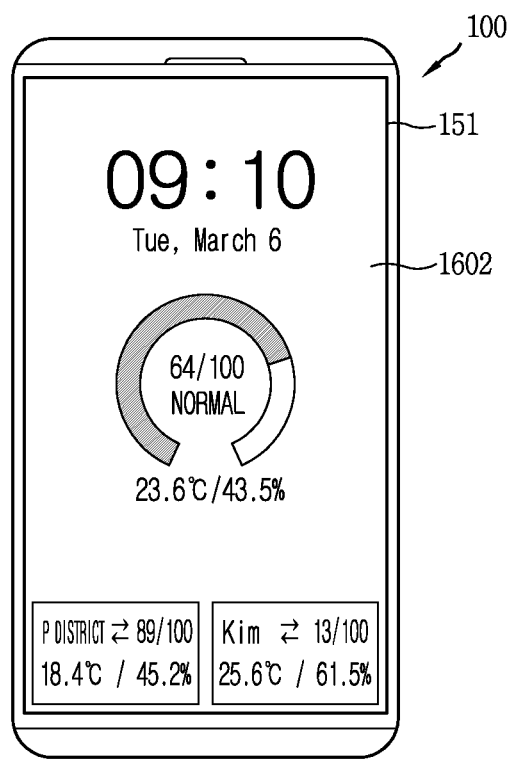

First, an address for confirming the dust concentration or a position of a specific person can be set using the AOD alarm through the setting screen 1601 shown in FIG. 16A. As a result, as shown in FIG. 16B, dust concentration values at an address 'P district' position set to 'card 1' and at a specific person 'Kim' position set to 'card 2' on the setting screen 1601 in FIG. 16A may be displayed at the bottom of the AOD screen 1602 as shown in FIG. 16B, and a dust concentration value at a place where the terminal is currently located may be displayed together in the middle of the screen. In addition, the type and number of cards to be displayed on the AOD screen 1602 may be changed through the setting screen 1601 in FIG. 16A.

Moreover, information on air quality received through a network service such as a weather station may be displayed together or displayed as data compared with a current region on the AOD screen 1602.

Figure 16C:
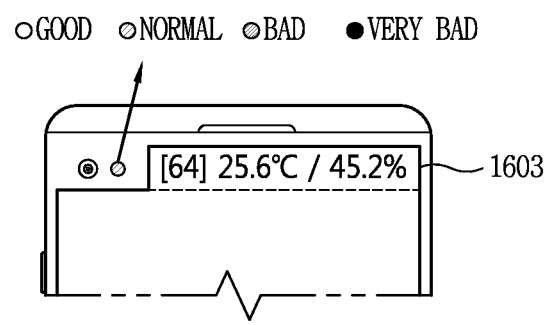
Figure 16D:
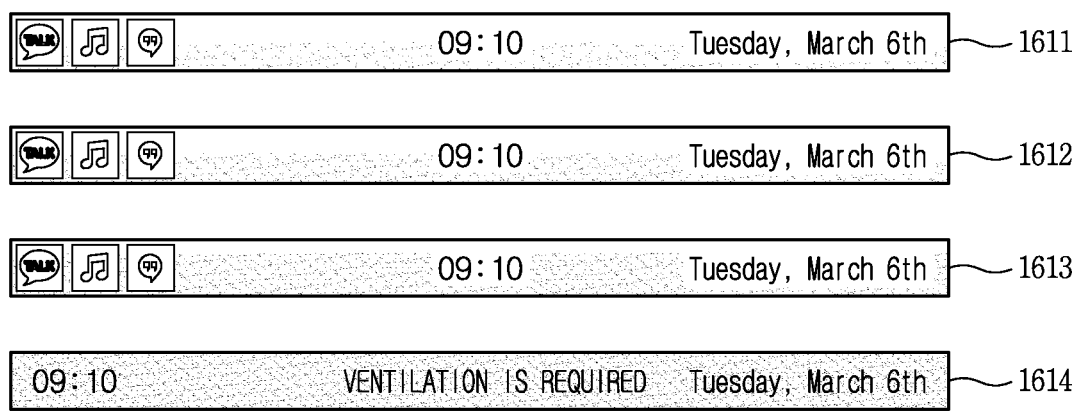

On the other hand, an indicator in which time information is continuously displayed may be displayed in one region of the display unit 151. In addition, the indicator may further display an image indicating the dust concentration level of dust detected in real time through the dust sensor 143. FIG. 16C illustrates a view in which environment information is displayed on a second screen located at the top of the display unit, and a dust concentration level is shown by the color of an LED light adjacent to the second screen. Alternatively, as illustrated in FIG. 16D, a current dust concentration level along with time information on an edge screen located on a side of the display unit 151 may be expressed by various background colors 1611, 1612, 1613 of the edge screen. At this time, when the detected dust concentration level exceeds a reference value, a notification icon 1614 similar to the event notification may be popped up.

FIGS. 17A through 17D show examples associated with a method of providing an action guide according to a detected dust concentration level. First, referring to FIG. 17A, there is shown a screen for setting the type of notification to be provided when the detected dust concentration level or environment information (e.g., hazardous gas, temperature, etc.) indicates an abnormal value.

Figure 17A:
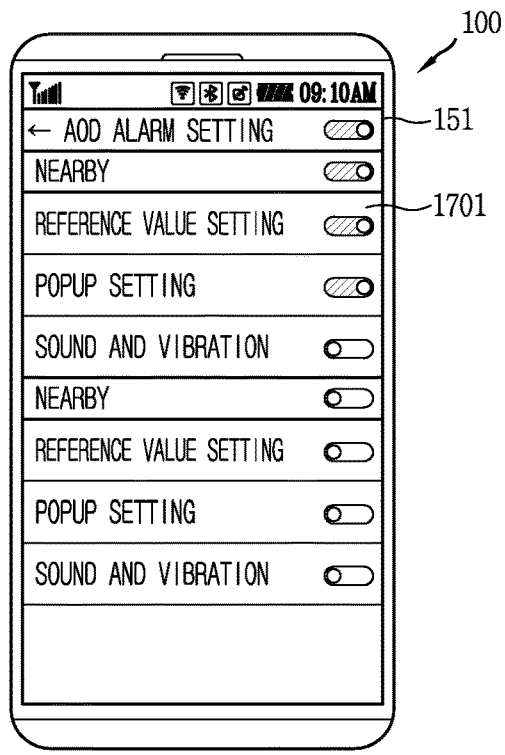
Figure 17B:
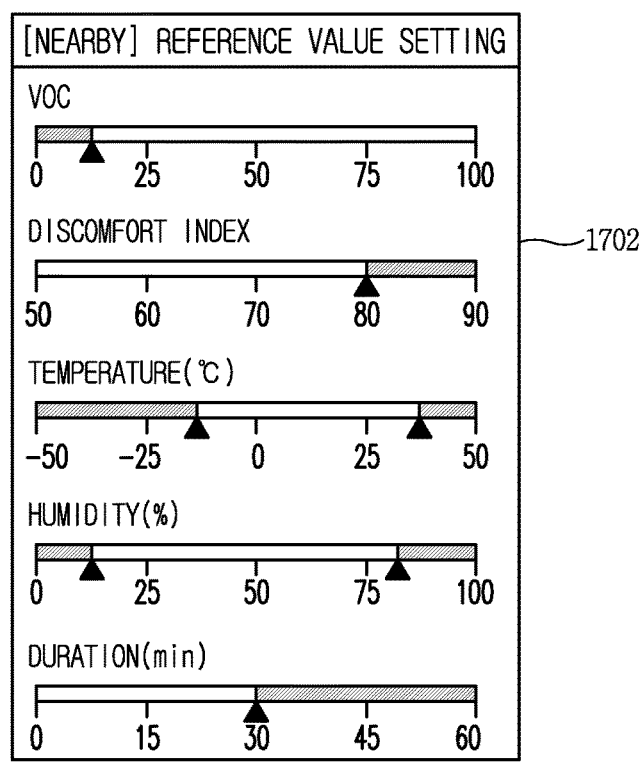
Figure 17C:
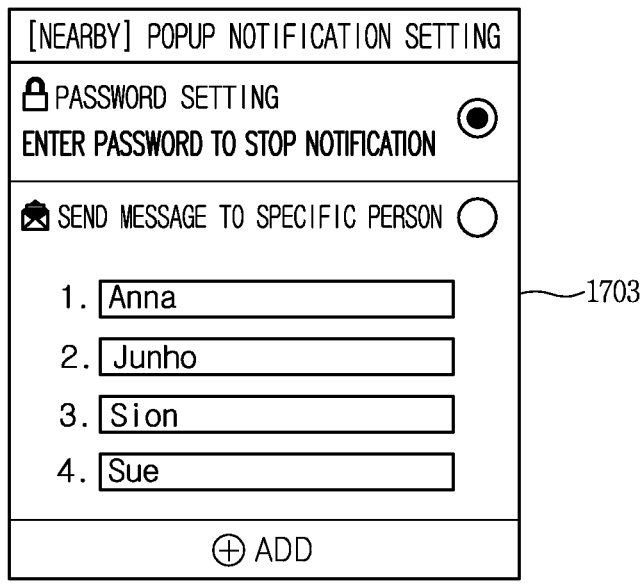
Figure 17D:
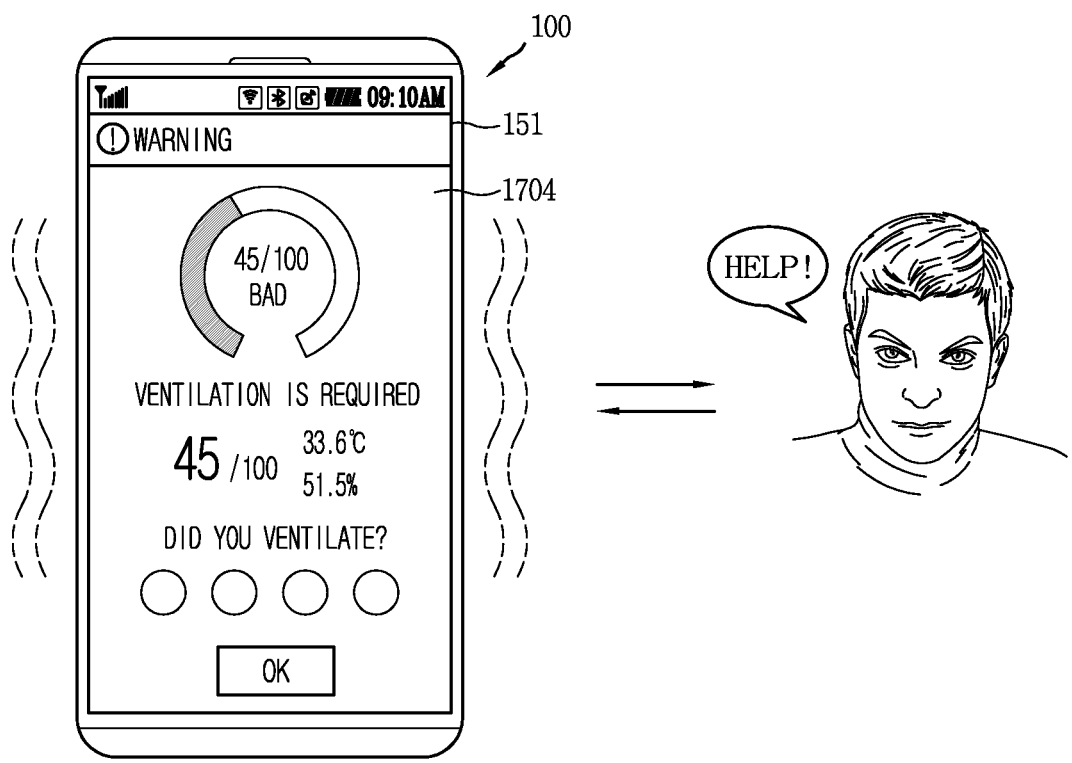

When a reference value setting item is selected on the screen 1701 in FIG. 17A, an option screen 1702 for setting a measurement reference value differently for various environment information (e.g., VOC, unpleasantness index, temperature and humidity, duration time, etc.). Furthermore, when a pop-up setting item is selected on the screen 1701 in FIG. 17A, an additional option screen 1703 for editing password setting for releasing a notice generated upon detection of an abnormal value and a list of specific persons to which a message of an abnormal situation is to be transmitted is provided as shown in FIG. 17C.

When an abnormal value is detected after the setting of the additional option as described above, a notification screen 1704 indicating an abnormal value, a user's action guide, action execution confirmation is displayed on the display unit 151 until the password is entered. At the same time, a message indicating an abnormal situation is transmitted to a designated specific person.

For another example, when a multi-cell gas sensor is added as an environment sensor, whether there is a gas leak may be checked by selectively measuring carbon monoxide, butane, propane, and the like which are harmful when a person inhales, and when it is determined that fire occurs through additional sensing through the proximity sensor, the illuminance sensor, the microphone, the temperature sensor, and the like, the user may execute an automatic notification reception to the nearest fire department.

Hereinafter, FIGS. 18A to 19B are examples of UIs/UXs associated with a method of recognizing and analyzing a behavior pattern of a user based on monitored environment information and log data collected in a specific section.

The controller 180 compares the dust concentration level of dust detected during the selected section with a predetermined reference value to display environmental analysis data according to the comparison on the display unit 151 using log data collected in the selected section.

Figure 18A:
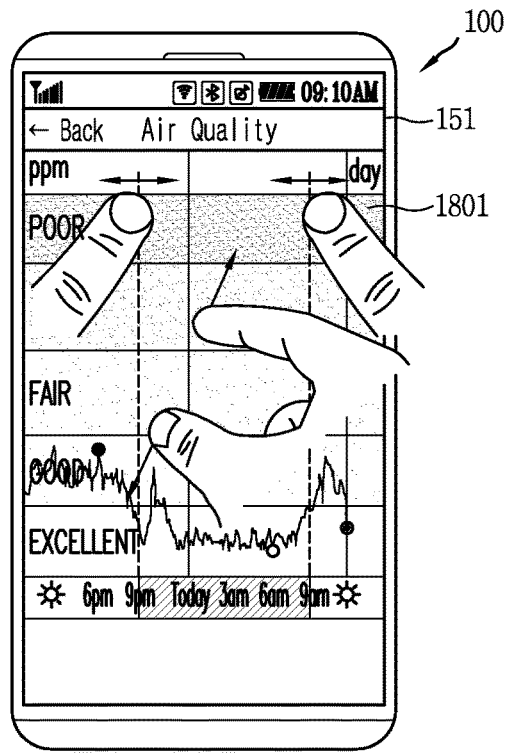
Figure 18B:
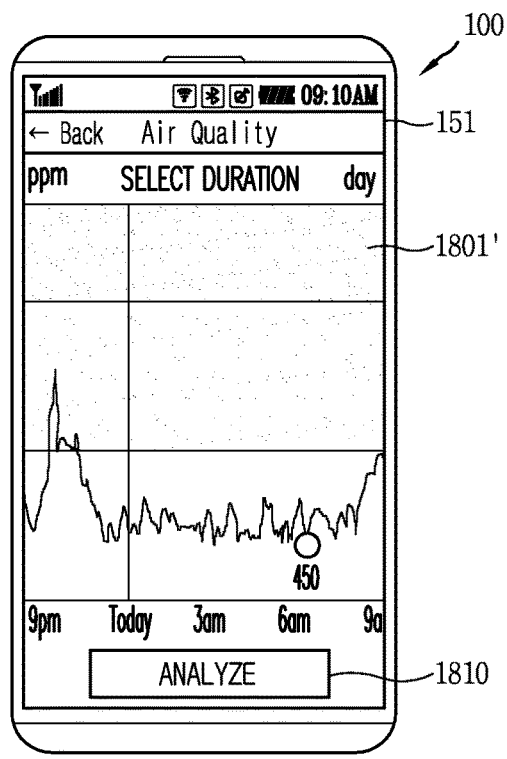
Figure 18C:
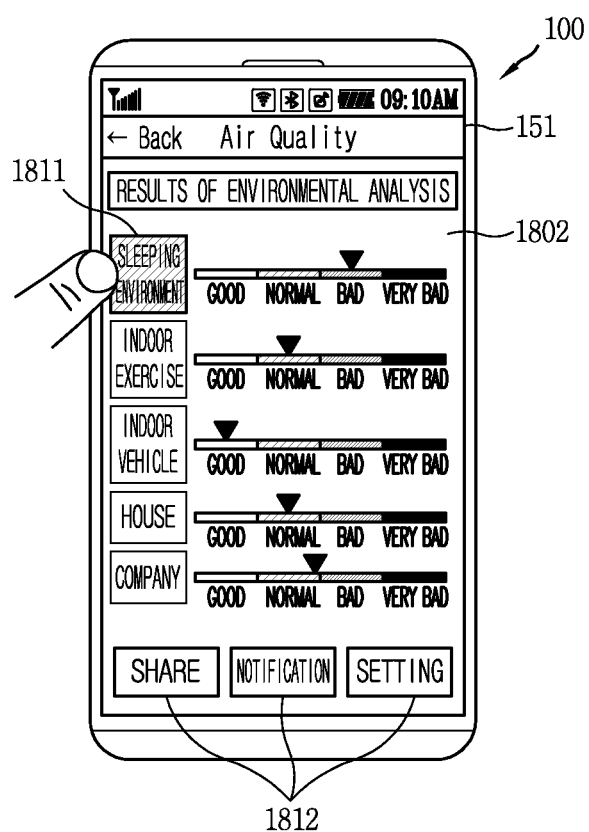

For example, a specific section may be selected based on various touch gestures (e.g., pinch in/out, flicking, double touch, touch and drag, etc.) applied to a full range screen 1801 in which the log data shown in FIG. 18A are collected. When a menu 1810 for analysis on the selected section screen 1801' is selected as shown in FIG. 18B, an analysis screen 1802 of log data and environment information collected from the terminal 100 is displayed during the selected section as illustrated in FIG. 18C.

The analysis screen 1802 may be provided with environmental analysis data by location (e.g., vehicle, house, company, etc.) and/or user behavior (e.g., sleeping environment, indoor exercise, etc.), and further provided with additional options 1812 capable of performing sharing, notification (abnormal numerical threshold value), setting, and the like of the provided environmental analysis data.

Figure 19A:
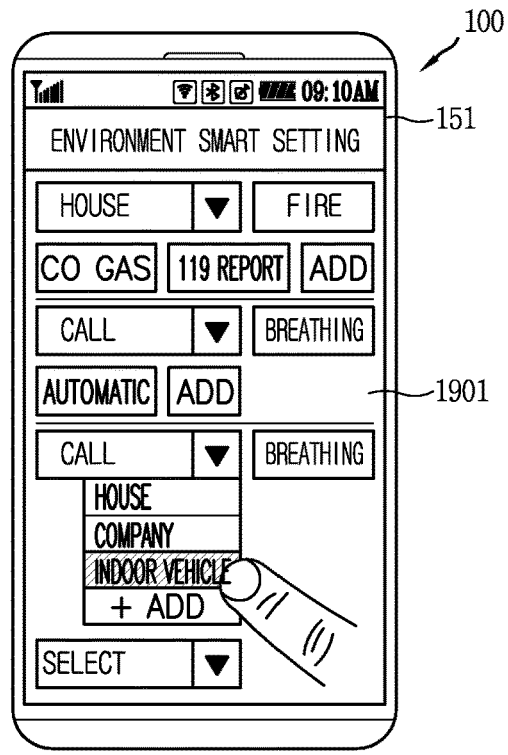

When a setting item of the additional options 1812 is selected, a setting screen 1901 shown in FIG. 19A is displayed. Using the displayed setting screen 1901, the user may set a detailed action guide for a specific place or a specific action, for example, a ventilation time, and the like.

Figure 19B:
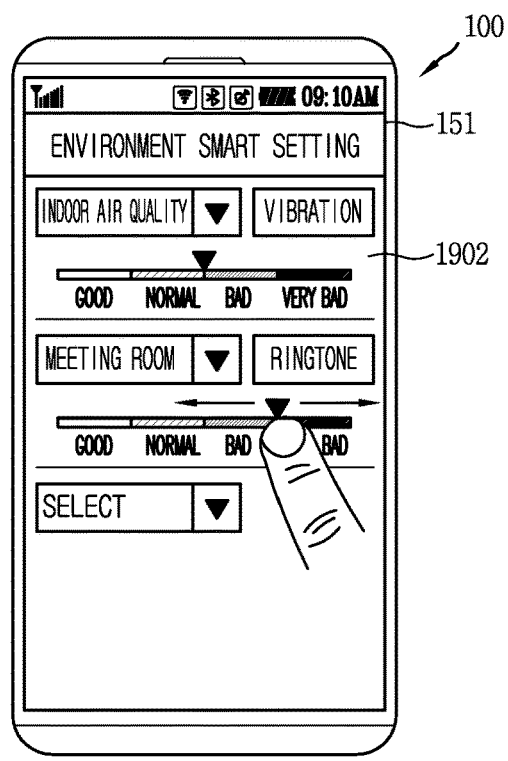

Furthermore, when a notification item is selected from the additional options 1812, an alarm setting screen 1902 is displayed upon detection of an abnormal numerical value of the environmental analysis data as shown in FIG. 19B. The user may adjust the notification method and intensity to be displayed when an abnormal value is detected at a specific place using the displayed alarm setting screen 1902.

As described above, according to a mobile terminal and an operation method thereof according to the embodiment of the present disclosure, a miniaturized dust sensor that is not required to provide a chamber in which air is introduced or a passage for controlling the path of light may be mounted thereon, thereby maintaining a low thickness of a terminal product. In addition, according to the straight structure of the mounted dust sensor, a hole size exposed to the outside may be considerably reduced, thereby implementing a bezel-less design. In addition, even when an actual dust detection area is reduced due to an decrease in a hole size of the dust sensor, the detection time and the detection period may be adjusted first in accordance with a situation such as an increase of concentration value or battery shortage, thereby changing the dust detection area of the dust sensor with no addition or change in the hardware configuration. Moreover, a function of the proximity sensor of the terminal may be replaced without collision through the mounted dust sensor, and the detected dust information may be shared with a third party and updated in real time, thereby quickly and intuitively checking air quality for the searched place.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
   a display;
   a front window disposed at a front of the mobile terminal;
   an inner frame formed with a hole configured to allow light to pass through from the front window; and
   a dust sensor comprising a light emitting portion and a light receiving portion,
   wherein the light emitting portion is disposed adjacent to the inner frame and configured to emit light through the hole, and
   wherein the light receiving portion is configured to generate a signal based on light sensed through the hole that is emitted by the light emitting portion and scattered by dust particles.

2. The mobile terminal of claim 1, further comprising a controller configured to:
   control a light emission period of the light emitting portion and detect dust particles using the generated signal; and
   determine a size, number, and movement speed of the dust particles based on the generated signal.

3. The mobile terminal of claim 1, wherein the dust sensor is disposed at a position corresponding to a light path formed at an upper end of the front window and the inner frame, and the light emitting portion emits the light in a straight line through along the light path through the front window and the inner frame.

4. The mobile terminal of claim 2, wherein the controller is further configured to change a light emission period of the light emitting portion according to the size, number, and movement speed of the dust particles, and detect dust particles during a detection period corresponding to the changed light emission period.

5. The mobile terminal of claim 4, wherein the controller is further configured to calculate the movement speed of the dust particles passing through a dust detection section corresponding to the hole using the generated signal in real time, and variably apply a dust detection time according to the calculated movement speed to detect dust particles within an extended reference range.

6. The mobile terminal of claim 5, wherein the controller is further configured to increase a light emission period of the light emitting portion as the dust detection time corresponding to the calculated movement speed of dust increases.

7. The mobile terminal of claim 6, wherein the controller is further configured to determine a dust concentration level corresponding to the detected dust particles and change the extended reference range according to the determined dust concentration level.

8. The mobile terminal of claim 7, wherein the controller is further configured to increase the dust detection time such that the extended reference range increases as the determined dust concentration level increases.

9. The mobile terminal of claim 2, wherein the dust sensor is used to sense proximity of an object when the mobile terminal is in a preset operation mode.

10. The mobile terminal of claim 2, wherein the dust sensor is used to sense proximity of an object during a detection state in which dust particles exceed a threshold size.

11. The mobile terminal of claim 10, wherein the dust sensor is used again to sense dust when the detection state is no longer detected or a predetermined time in the detection state has elapsed.

12. The mobile terminal of claim 2, further comprising an illumination sensor,
wherein the controller is further configured to switch to an operation mode for sensing proximity of an object via the dust sensor in response to a low illuminance state below a threshold value detected by the illumination sensor.

13. The mobile terminal of claim 2, further comprising:
a wireless communication unit configured to transmit a wireless signal,
wherein the controller is further configured to control the display to display dust information corresponding to the detected dust particles and transmit a signal corresponding to the displayed dust information to an external terminal via the wireless communication unit in response to a sharing request signal.

14. The mobile terminal of claim 13, wherein the wireless communication unit comprises a location information module for sensing location information of the mobile terminal, and
the controller is further configured to transmit the dust information to an external terminal matching a designated contact when a location of the mobile terminal sensed by the location information module matches a designated location.

15. The mobile terminal of claim 2, wherein the controller is further configured to:
control the display to display a map screen comprising first dust information corresponding to dust particles detected via the dust sensor; and
control the display to display second dust information received from an external terminal at a corresponding position on the map screen, and
control the display to display a sharing history of the second dust information received from the corresponding position when the second dust information is selected.

16. The mobile terminal of claim 15, wherein the controller is further configured to control the display to display a graphic object indicating a dust concentration level corresponding to the first and second dust information, wherein the graphic object is changed in real time as the dust concentration level of the first or second dust information is updated.

17. The mobile terminal of claim 1, wherein the controller is further configured to control the display to display an indicator comprising time information and an image indicating a dust concentration level of dust particles detected in real time via the dust sensor.

18. The mobile terminal of claim 2, wherein the controller is further configured to compare a dust concentration level of dust particles detected with a predetermined reference value and control the display to display environmental analysis data according to the comparison.

* * * * *